(12) United States Patent
Bhadkamkar et al.

(10) Patent No.: US 6,360,202 B1
(45) Date of Patent: *Mar. 19, 2002

(54) VARIABLE RATE VIDEO PLAYBACK WITH SYNCHRONIZED AUDIO

(75) Inventors: Neal A. Bhadkamkar; Subutai Ahmad, both of Palo Alto; Michele Covell, Los Altos Hills, all of CA (US)

(73) Assignee: Interval Research Corporation, Pala Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/239,455

(22) Filed: Jan. 28, 1999

Related U.S. Application Data

(63) Continuation of application No. 08/760,769, filed on Dec. 5, 1996, now Pat. No. 5,893,062.

(51) Int. Cl.[7] .......................... G10L 11/04; G10L 21/04
(52) U.S. Cl. .......................... 704/270; 386/66; 704/503
(58) Field of Search .................. 386/66, 54; 704/503, 704/270, 500, 501; 364/514

(56) References Cited

U.S. PATENT DOCUMENTS

| | | | |
|---|---|---|---|
| 5,175,769 A | 12/1992 | Hejna, Jr. et al. | 381/34 |
| 5,420,801 A | 5/1995 | Dockter et al. | 364/514 R |
| 5,664,227 A | 9/1997 | Mauldin et al. | 395/778 |
| 5,687,095 A | 11/1997 | Haskell et al. | 364/514 A |
| 5,692,213 A | 11/1997 | Goldberg et al. | 395/806 |
| 5,828,994 A | 10/1998 | Covell et al. | 704/211 |

FOREIGN PATENT DOCUMENTS

| | | |
|---|---|---|
| EP | 0 681 398 A2 | 11/1995 |
| WO | WO 96/12270 | 4/1996 |

OTHER PUBLICATIONS

B. Arons, "Techniques, Perception, and Applications of Time–Compressed Speech," Proceedings of 1992 Conference of American Voice I/O Society, Sep. 1992, pp. 169–177.

E. Moulines and J. Laroche, "Non–parametric techniques for pitch–scale and time–scale modification of speech," Speech Communication, vol. 16, 1995, pp. 175–205.

(List continued on next page.)

*Primary Examiner*—William Korzuch
*Assistant Examiner*—Abul K. Azad
(74) *Attorney, Agent, or Firm*—David R. Graham

(57) ABSTRACT

The invention enables the apparent display rate of an audiovisual display to be varied. The invention can modify an original set of audio data in accordance with a target display rate, then modify a related original set of video data to conform to the modifications made to the audio data set, such that the modified audio and video data sets are synchronized. When the modified audio and video data sets so produced are used to generate an audiovisual display, the audiovisual display has an apparent display rate that approximates the target display rate. The target display rate can be faster or slower than a normal display rate at which an audiovisual display system generates an audiovisual display from the original sets of audio and video data. The target display rate can be established solely by a user instruction, by analysis of the audiovisual data, or by modification of a user-specified nominal target display rate based upon analysis of the audiovisual data. Preferably, the method for modifying the original audio data set is one that produces a modified audio data set that can be used to generate an audio display having little or no distortion.

102 Claims, 8 Drawing Sheets

OTHER PUBLICATIONS

D. P. Huttenlocher, J. J. Noh and W. J. Rucklidge, "Tracking Non–Rigid Objects in Complex Scenes," IEEE International Conference on Computer Vision, 1993, pp. 93–101.

S. Roucos and A. M. Wilgus, "High Quality Time–Scale Modification for Speech," IEEE International Conference on Acoustics, Speech, and Signal Processing, 1985, vol. 2, pp. 493–496.

R. Zabih, J. Woodfill and M. Withgott, "A Real–Time System for Automatically Annotating Unstructured Image Sequences," IEEE International Conference on Systems, Man, and Cybernetics, 1993, 6 pages.

U.S. application No. 08/528,891, Ahmad et al., filed Sep. 15, 1995.

VARIABLE RATE VIDEO PLAYBACK WITH SYNCHRONIZED AUDIO

This application is a continuation of prior application Ser. No. 08/760,769, filed Dec. 5, 1996, now U.S. Pat. No. 5,893,062.

BACKGROUND OF THE INVENTION

1. Field of the Invention

This invention relates to the display of audio and video data and, in particular, to variation of the apparent display rate at which the audio and video data is displayed.

2. Related Art

It is desirable to be able to vary the apparent display rate (i.e., the rate of change of the display as perceived by an observer, as opposed to the rate at which data is processed to generate the display) of a display generated from audio, video, or related audio and video data. For example, it may be desirable to increase the apparent display rate so that a quick overview of the content of the data can be obtained, or because it is desired to listen to or view the display at a faster than normal rate at which the content of the display can still be adequately digested. Alternatively, it may be desirable to slow the apparent display rate so that the display can be more carefully scrutinized, or because the content of the display can be better digested at a slower rate.

Both audio and video data can be represented in either analog or digital form. The method used to manipulate audio and/or video data to accomplish variation in the apparent display rate of a display generated from that data depends upon the form in which the data is represented. However, conventional devices enable data in one form to be easily converted to the other form (i.e., analog to digital or digital to analog), thus affording wide latitude in the use of methods to accomplish display rate variation, regardless of the form in which the data originally exists.

The apparent display rate of an audio display or a video display can be increased or decreased by deleting specified data from, or adding specified data to (e.g., repeating certain data), respectively, a corresponding set of digital audio data or digital video data that represents the content of the display. Previously, such variation of the apparent display rate of either an audio display or a video display has been accomplished using one of a variety of techniques. For example, the apparent display rate of an audio display represented by a set of digital audio data has been varied by using the synchronized overlap add (SOLA) method (discussed in more detail below) to appropriately modify an original set of digital audio data to produce a modified set of digital audio data from which the audio display is generated.

Often, a set of audio data is related to a particular set of video data and the two are used together to generate an audiovisual display, such as occurs, for example, in television broadcasts, motion pictures or computer multimedia displays. When the apparent display rate of an audiovisual display is varied, the audio display and video display must be synchronized to maintain temporal correspondence between the content of the audio and video displays. (Alternatively, the audio display can be eliminated altogether, thus obviating the need to maintain synchronization; however, the content of the audio display is lost.)

Previously, the apparent display rate of an audiovisual display has been varied by deleting or repeating video data (e.g., video frames) in a uniform manner, as appropriate, and deleting or repeating audio data in a uniform manner that corresponds to the treatment of the video data (e.g., if the apparent display rate of the video display is speeded up to 2 times the original display rate by, for example, eliminating every other video frame, then the audio display is likewise speeded up by eliminating every other audio sample or every other set of a predetermined number of audio samples). While this approach is effective in maintaining synchronization, it can cause distortion in the audio and video displays, particularly at relatively high or low apparent display rates. In particular, the audio display can be distorted so that, as the apparent display rate increases, human voices increasingly begin to manifest a "chipmunk effect," and, as the apparent display rate decreases, human voices begin to sound as though the speaker is in a stupor. Such distortion of the display is a consequence of the fact that the elimination of audio data from the original set of audio data is done mechanically, without consideration of the content of the audio data being eliminated or retained.

A better way of varying the apparent display rate of an audiovisual display is desirable. In particular, an approach that "intelligently" modifies the audio and/or video data used to generate the display based upon an evaluation of the content of the audio data and/or video data is desirable, since such an approach can reduce or eliminate distortion of the display, and, in particular, the audio display. Good synchronization between the audio and video displays should also be maintained. Additionally, the capability of varying the apparent display rate over a wide range of magnitudes is desirable. Further, preferably the variation of the apparent display rate can be accomplished automatically in a manner that produces an apparent display rate that closely tracks a specified target display rate or rates.

SUMMARY OF THE INVENTION

The invention enables the apparent display rate of an audiovisual display to be varied. The invention can cause an original set of audio data to be modified in accordance with a target display rate (which can be a single target display rate or a sequence of target display rates, as discussed further below) based upon an evaluation of the content of the audio data set, then cause a related original set of video data to be modified to conform to the modifications made to the original audio data set such that the modified audio and video data sets (and, thus, the displays produced therefrom) are synchronized. When the modified audio and video data sets so produced are used to generate an audiovisual display, the audiovisual display has an apparent display rate (or rates) that approximates the target display rate (or rates). Ensuring that the modified audio and video data sets are synchronized minimizes or eliminates the dissonance (e.g., a temporal mismatch between spoken words in the audio display and the corresponding movement of the speaker's lips in the video display) that would otherwise be experienced if the audio and video displays were not synchronized. Further, modifying the original audio data set directly, based upon an evaluation of the content of the audio data, to produce variation in the apparent display rate of the audiovisual display is advantageous in that it can enable minimization or elimination of artifacts (e.g., pitch doubling, pops and clicks) in the audio display. Preferably, the original audio data set is modified in a manner that produces a modified audio data set that can be used to generate an audio display having little or no distortion (e.g., there is a reduction or elimination of the tendency of human voices to sound like chipmunks when the apparent display rate is increased above a normal display rate or sound stupefied when the apparent display rate is decreased below a normal display rate). Generally, in accordance with the invention, a target display rate (and, thus, typically, the apparent display rate) can be faster or slower than a normal display rate at which an audiovisual display system generates an audiovisual display from the original sets of audio and video data. In particular, as will be better appreciated from the description below, the methods used to produce the modified audio data set enable a wide range of apparent display rates to be produced without introducing an unacceptable amount of distortion into the audiovisual display (in particular, the audio display).

In one embodiment of the invention, the apparent display rate of an audiovisual display can be varied from a normal display rate at which an audiovisual display system generates the audiovisual display from an original set of audio data and a related original set of video data by: i) defining a correspondence between the original set of audio data and the original set of video data; ii) determining a target display rate (which can be in fact, a sequence of target display rates) for the audiovisual display; iii) creating a modified set of audio data, based upon the target display rate and an evaluation of the content of the original set of audio data, that corresponds to the original set of audio data; and iv) creating a modified set of video data, based upon the modified set of audio data, the correspondence between the modified set of audio data and the original set of audio data, and the correspondence between the original set of audio data and the original set of video data.

A target display rate can be established "manually" by a user instruction (i.e., by specification of a nominal target display rate by the user). Alternatively, a target display rate can be established automatically, without user input, based upon analysis of the audiovisual data. Or, a target display rate can be established by automatically modifying a user-specified nominal target display rate based upon analysis of the audiovisual data. As indicated above, when a nominal target display rate is specified by a user, a single target display rate can be specified for the entire audiovisual display, or a series of target display rates, each corresponding to a portion of the audiovisual display, can be specified. Likewise, a single target display rate or a series of target display rates can be automatically established (either "from scratch" or based upon an initially specified nominal target display rate or rates) in accordance with the invention. Moreover, as will be better appreciated from the description below, the invention enables a user to vary a nominal target display rate in real time as the audiovisual display is being generated.

Any appropriate method of automatically determining a target display rate, or automatically modifying a nominal target display rate, can be used. Such automatic determination or modification of the target display rate can be accomplished by evaluating the original set of audio data, the original set of video data, or both. Moreover, the target display rate can be established automatically by multiple evaluations of the audio and/or video data sets. The audio data set can be evaluated, for example, to determine the stress with which spoken portions of the audio data are uttered (by, for example, computing an energy term for the spoken portions), and the target display rate based upon the relative stresses of the spoken portions of the audio data. Or, the audio data set can be evaluated to determine the speed with which spoken portions of the audio data are uttered (by, for example, ascertaining spectral changes in the spoken portions), and the target display rate based upon the relative speeds of the spoken portions of the audio data. Or, both the stress and speed with which spoken portions of the audio data set are uttered can be determined and combined to produce audio tension values for the spoken portions, the target display rate being based upon the audio tension values of the spoken portions. The video data set can be evaluated, for example, to determine the relative rate of change of the video data along various population-based dimensions (described in more detail below), and the target display rate based upon that evaluation. Or, the video data set can be evaluated by ascertaining portions of the corresponding video image that change quickly, as well as the frequency with which such quick changes occur, and basing the target display rate on the occurrence and frequency of such quick changes. Or, the video data set can be evaluated by tracking the motion of objects within the corresponding video image, and basing the target display rate on the appearance of new objects in the video image.

The modified set of audio data can be created based upon the magnitude of the target display rate and an analysis of the content of the audio data. For example, the modified set am of audio data can be created by; i) dividing the original set of audio data into a plurality of segments, each segment representing a contiguous portion of the set of audio data that occurs during a specified duration of time, each segment being adjacent to one or two other segments such that there are no gaps between segments and adjacent segments do not overlap; ii) overlapping an end portion of a first segment with an adjacent end portion of a second segment that is adjacent to the first segment (the overlap can be negative, as described in more detail below); iii) identifying as part of the modified set of audio data the audio data from the first segment that is not part of the overlapped end portion of the first segment; iv) blending the data of the corresponding overlapped end portions; and v) determining whether there are additional segments in the original set of audio data that have not been overlapped with an adjacent segment, wherein if there are additional segments, the additional segments are processed in accordance with the description above (a new first segment being created from the blended data and the non-overlapped data from the previous second segment), and if there are not additional segments, the blended data and the non-overlapped data from the second segment are included as part of the modified audio data set.

The modified set of video data can be created by: i) establishing a correspondence between the modified audio data set and the original video data set, based upon a correspondence between the modified audio data set and the original audio data set and a correspondence between the original audio data set and the original video data set; ii) grouping the audio data of the modified audio data set into audio segments having the same amount of audio data as found in audio segments of the original audio data set; iii) for each of the audio segments of the modified audio data set, identifying one or more partial or complete subunits of video data from the original video data set that correspond to audio data in the audio segment of the modified audio data set, based upon the correspondence between the modified audio data set and the original video data set; and iv) modifying the video frames in the original video data set as necessary to produce the modified video data set so that there is a one-to-one correspondence between audio segments of the modified audio data set and video frames of the modified video data set. The modified set of video data can be created by eliminating data from the original video data set, adding data to the original video data set, blending data from the original video data set, and/or synthesizing data based on the data in the original video data set.

The modified sets of audio and video data can be stored for later use in generating an audiovisual display, or they can be used immediately to generate an audiovisual display. In particular, in the latter case, the invention can be used to generate an audiovisual display in which the apparent display rate of the display can be varied in real-time. Such real-time variation of the apparent display rate is possible since the method of modifying the audio data set described above does not require knowledge of the audio data of the original audio data set far into the future to enable production of a modified audio data set, but, rather, only the audio data comprising a next segment of the original audio data set. Further, since the calculations for determining modified audio and video data can be done just prior to generating a display from that data, the calculations can be done based on a very recently determined (e.g., specified in real time by a user) target display rate. Moreover, the quantity of calculations required by a method of the invention can be performed by current processing devices sufficiently quickly to enable generation of a real-time display from the modified audio and video data.

BRIEF DESCRIPTION OF THE DRAWINGS

FIG. 4A illustrates the blending of the first and second segments of the audio data set. FIG. 4B illustrates the blending of the second and third segments of the audio data set. FIG. 4C illustrates the blending of the third and fourth segments of the audio data set.

DETAILED DESCRIPTION OF THE INVENTION

The invention enables the apparent display rate of an audiovisual display to be varied. The audiovisual display can be generated from related sets of audio and video data (the "original" sets of audio and video data) at a normal display rate by an audiovisual display system. The invention can enable the original sets of audio and video data to be modified in accordance with a target display rate or rates (which, in the usual case, are different—either faster or slower—than the normal display rate) so that, when the modified sets of audio and video data are used to generate an audiovisual display with the same audiovisual display system, the apparent display rate or rates of the audiovisual display are approximately equal to the target display rate or rates. (Note that it is possible—particularly when the magnitude of the target display rate is the same as, or similar to, the normal display rate—for a "modified" set of audio data or video data to be the same as the corresponding original set of audio data or video data.)

Figure 1:
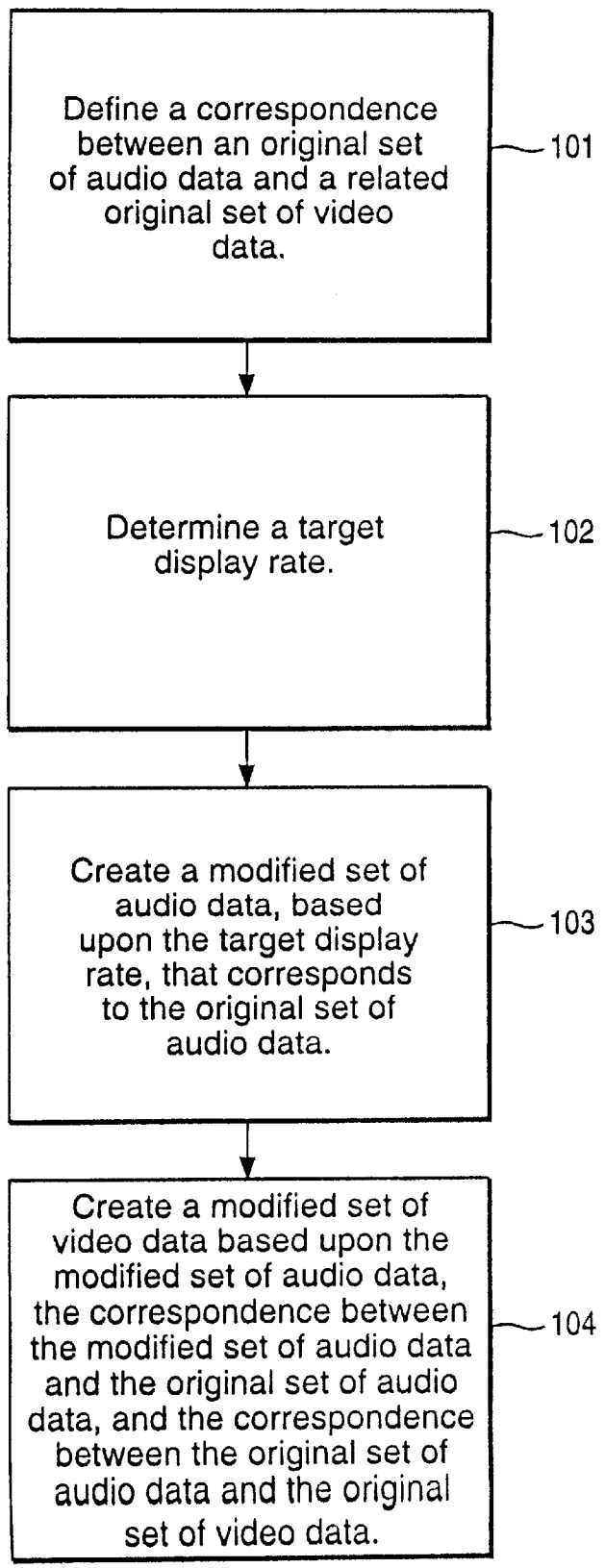
FIG. 1 is a flow chart of a method in accordance with the invention.

FIG. 1 is a flow chart of a method 100 in accordance with the invention. The method 100 accomplishes variation in the apparent display rate of the audiovisual display by modifying an original audio data set in accordance with a target display rate to produce a modified audio data set, then modifying a related original video data set to produce a modified video data set such that a correspondence between the audio data and video data of the original data sets is maintained in the modified data sets. Preferably, the original audio data set is modified in a manner that produces a modified audio data set that generates an audio display having little or no distortion.

The sets of audio data and video data can be either digital or analog (in many applications for which the invention is useful, the latter is typically the case). As will be understood by those skilled in the art of computer programming, the method 100 (and other methods of the invention described below) can be implemented, for example, on any appropriately programmed digital computer. Thus, if the audio and/or video data are initially analog, then the audio and/or video data can be digitized, using well-known processes and apparatus, to enable the method 100 to be implemented on a digital computer. The digital audio data can, for example, be represented as a sequence of audio samples that represent the amplitude of the analog audio signal at equally spaced points in time. The digital video data can, for example, be represented as a sequence of frames of pixels of video data (each pixel can further include separate pieces of data that each represent the presence of a particular color in that pixel).

Figure 2:
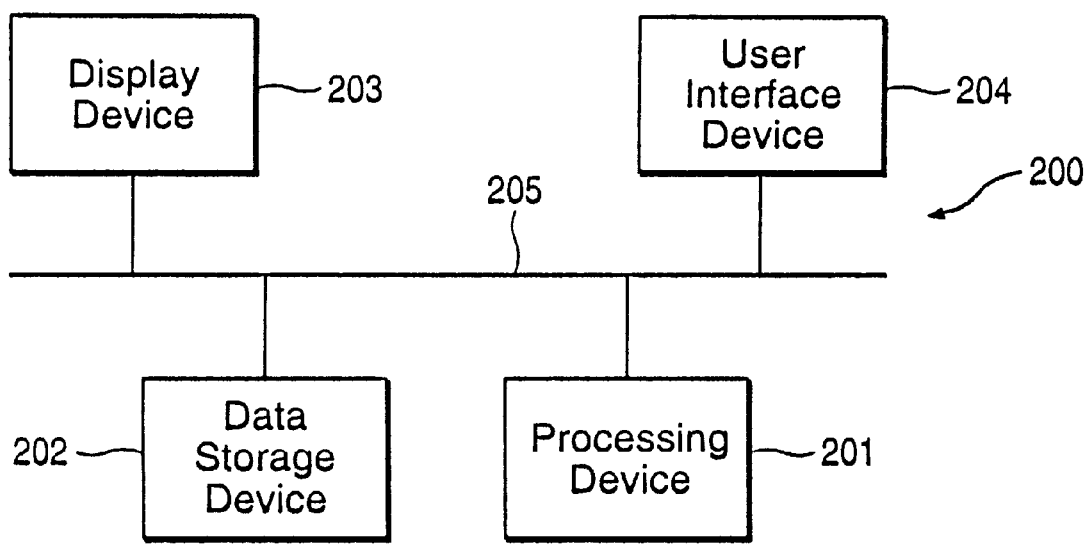
FIG. 2 is a simplified representation of a system with which the invention can be implemented.

FIG. 2 is a simplified representation of a system 200 with which the invention can be implemented. The system 200 includes a processing device 201 (e.g., a conventional microprocessor), a data storage device 202 (e.g., a conventional random access memory and/or a conventional hard disk), a display device 203 (e.g., a conventional computer display monitor, television set and/or audio speakers) and a user interface device 204 (e.g., a conventional remote control, computer keyboard, mouse and/or touchscreen). These devices, as well as other conventional devices (not shown), such as those that can be part of a typical digital computer, can interact with each other over a conventional computer bus 205. It is to be understood that the invention can be implemented with other systems having components and/or a configuration other than that shown in FIG. 2. For example, if the audio data and/or video data is initially analog data, and the processing device is implemented as part of a digital computer, a system for implementing the invention can include a conventional A/D converter to convert the analog data to digital data. If such a system also included an analog display device (such as a television), the system could also include a conventional D/A converter to convert the processed digital data to analog form.

Returning to FIG. 1, in step 101 of the method 100, a correspondence between the original audio data set and the original video data set is established. As indicated above, digital audio data can be represented as a sequence of audio samples and digital video data can be represented as a sequence of video frames. As will be apparent from the description below, a convenient basis for establishing a correspondence between such audio and video data is to determine the number of audio samples that have the same duration as a frame of video data, and define that number of samples as an audio segment. (However, more generally, herein, an audio "segment" represents a contiguous portion of a set of audio data that occurs during a specified duration of time.) The determination of the number of audio samples that correspond in duration to a video frame can be made from the video frame rate and audio sample rate at which video data and audio data, respectively, are input to a video display device and audio display device of an audiovisual display system with which the invention is implemented. After establishing the number of samples in an audio segment, a correspondence between audio segments and video frames can then be established. For example, the audio segments can be defined so that each audio segment corresponds to a single particular video frame (such as occurs when the modified SOLA method is used to implement step 103 of the method 100, as described below). Or, overlapping audio segments can be defined so that each segment can correspond to part or all of one or more video frames (such as would occur when the unmodified SOLA method is used to implement step 103 of the method 100, as described below). The former implementation is less computationally expensive (and may, therefore, be preferable), since the matching of audio segments with particular unique video frames is more straightforward than the maintenance throughout the steps of the method 100 of a record of the correspondences between audio segments and video frames of the latter implementation.

In step 102, a target display rate is determined. As described above, generally, the target display rate can be faster or slower than the normal rate at which the audiovisual data (i.e., the audio and/or video data) is displayed. The target display rate can be indicated as a number representing a multiple of the normal display rate, i.e., a target display rate lower than 1 represents a display rate slower than the normal display rate and a target display rate higher than 1 represents a display rate faster than the normal display rate. The choice of a particular method for producing modified audio and video data sets, as well as the content of the audio and video data, can limit the possible display rate changes that can be achieved.

A nominal target display rate can be specified manually by a user of an audiovisual display system with which the invention is implemented. A single target display rate can be specified for the entire audiovisual display, or a series of target display rates, each corresponding to a portion of the audiovisual display, can be specified. The step 102 can ascertain a nominal target display rate value or values specified by a user. If multiple nominal target display rate values are specified, the step 102 can also ascertain a beginning and end time within the audiovisual display for each nominal target display rate. The user can use any appropriate user interface device (such as the exemplary devices described below with respect to FIG. 2) to specify a value or values for the nominal target display rate.

It may be desirable to modify a specified nominal target display rate to increase the likelihood that the audio portion of the audiovisual display will be displayed in an intelligible manner or with acceptable fidelity. According to the invention, this can be done automatically as part of the step 102.The invention can also automatically determine the target display rate "from scratch," i.e., without specification of a nominal target display rate. However, in such a case, other criteria for governing the determination of the target display rate must be established. Several methods of automatically determining a target display rate, or modifying a nominal target display rate, are discussed in more detail below. However, any other appropriate method could be used.

In step 103, the original audio data set is manipulated, based upon the target display rate, to produce a modified audio data set. The modified audio data set is produced so that, generally, when the modified audio data set is used to generate an audio display, the audio display appears to be speeded up or slowed down by an amount that is approximately equal to the target display rate. Any appropriate method for modifying the original audio data set can be used. Some illustrative particular methods are discussed in more detail below.

In step 104, the original video data set is manipulated to produce a modified video data set. The correspondence between the modified audio data set and the original audio data set (step 103), and the correspondence between the original audio data set and the original video data set (step 101), are used to create a correspondence between the modified audio data set and the original video data set. Using the newly developed correspondence between the modified audio data set and the original video data set, video data can be deleted from or added to, as appropriate, the original video data set to create the modified video data set. Any appropriate method for creating the modified video data set from the modified audio data set can be used. Some illustrative particular methods are discussed in more detail below.

An audiovisual display can be generated from the modified data sets by an audiovisual display system. Any particular audiovisual display system can process audio and video data at a particular rate to produce an audiovisual display at a normal display rate. The audio and video data of the modified audio and video data sets are processed at the same rate by the audiovisual display system. However, since the modified audio and video data sets (in the usual case) have a different amount (either more or less) of data than the original audio and video data sets, the apparent display rate of the audiovisual display generated from the modified audio and video data sets is different than the normal display rate. Further, since, in step 104, the modified video data set is created based upon the content of the modified audio data set and a correspondence between the modified audio data set and the original video data set, the modified video data set is synchronized (at least approximately and, possibly, exactly) with the modified audio data set and produces a display of the same or approximately the same duration.

As will be better appreciated from the description below, the invention can make use of a method for modifying the audio data set that does not require knowledge of the audio data of the original audio data set far into the future to enable production of a modified audio data set, but, rather, only the audio data comprising a next segment of the original audio data set. Thus, the invention can enable the audiovisual display to be generated as the modified audio and video data sets are being produced. In particular, the invention advantageously allows the apparent display rate (via variation in the determined target display rate) to be varied in real time. Alternatively, the modified audio and video data sets can be stored on a conventional data storage device, such as a conventional computer hard disk, and displayed as desired at a later time.

An example will illustrate the operation of the method 100, as well as some minor adjustments that may be necessary in a practical implementation of the method 100. Illustratively, in a typical implementation, the invention can be implemented using a video display device that refreshes the video display with new digital video data at a rate of 30 frames per second, and one or more audio speakers that accepts digital audio data at a rate of 8000 samples per second. Thus, in such an implementation, each frame of video data corresponds in duration to 266.67 audio samples (step 101 of the method 100), i.e., 8000 samples per second divided by 30 frames per second. An audio segment can thus be defined as 266.67 audio samples. In practice, since an audio sample cannot be subdivided, the number of audio samples in each audio segment can be rounded up to the next highest integer or truncated to the next lowest integer, so that, on average, each audio segment includes the calculated number of audio samples per video frame. Thus, in this example, each set of three audio segments includes one segment having 266 audio samples and two segments having 267 audio samples, arranged in any desired order.

Further, let it be assumed in this example that the target display rate is 2.5 times the normal display rate (step 102 of the method 100). The original audio data set is modified in accordance with the target display rate to produce the modified audio data set (step 103 of the method 100). Here, that means creating a modified audio data set that has approximately 60% fewer audio samples than the original audio data set, so that the desired speedup of 2.5 is achieved. The modified audio data set includes subsets of audio data that each correspond to one of the audio segments of the original audio data set. Each of these subsets have, on average, approximately 60% fewer audio samples than were present in the corresponding audio segment of the original audio data set, though particular subsets can vary significantly from this average, as will be better appreciated from the description of FIGS. 3A, 3B, 4A, 4B and 4C below.

The audio speakers and the video display device expect to receive 8000 audio samples per second and 30 video frames per second, respectively. However, each 266.67 audio samples (in practice, 266 or 267 samples) of the modified audio data set correspond to, on average, 2.5 video frames from the original video data set. (This can be verified by noting that there are, on average, 2.5 audio samples in the original audio data set for each audio sample of the modified data set, and that each audio segment −266.67 audio samples—of the original audio data set corresponds to a video frame of the original video data set.) Thus, in order to maintain correspondence between the audio and video displays after modifying the audio data in accordance with the target display rate, it is necessary to reduce the number of video frames, so that each audio segment (i.e., 266.67 audio samples) of the modified audio data set will correspond to a single video frame. In this example, a modified video data set must be created that includes 1 video frame for each 2.5 video frames in the original video data set. Since video frames cannot be split apart temporally, to facilitate the invention, each audio segment of the modified audio data set is deemed to correspond to an integer number of video frames of the original video data set such that, on average, each audio segment of the modified audio data set corresponds to 2.5 video frames. In other words, the first audio segment might correspond to the first three frames of video data of the original video data set, while the second audio segment corresponds to the fourth and fifth (i.e., next two) frames of video data. The original video data set is then modified by retaining only one video frame from each set of video frames that corresponds to an audio segment of the modified audio data set. This can be accomplished, as discussed above, by eliminating or blending video frames.

As mentioned above with respect to step 102 of the method 100 (FIG. 1), a target display rate can be determined, or a specified nominal target display rate can be modified, automatically in accordance with the invention. Generally, a target display rate can be determined or modified automatically by analyzing the original set of audio data, the original set of video data, or both. Several methods that can be used to accomplish such automatic determination or modification of the target display rate are discussed below. It is to be understood, however, that any other appropriate method of determining or modifying a target display rate can be used with the invention.

One method of determining a target display rate is described in detail in the commonly owned, co-pending U.S. Pat. No. 5,828,994 entitled "Non-Uniform Time Scale Modification of Recorded Audio," by Michele Covell and M. Margaret Withgott, issued on Oct. 27, 1998 (hereafter referred to as "Covell and Withgott"), the disclosure of which is incorporated by ear reference herein. In that method, the audio data of a set of audiovisual data is analyzed and a sequence of target display rates are established on that basis. Briefly, in that method, the audio data set is searched for a particular speaking voice or voices (typically, though not necessarily, a voice or voices that are likely to be part of the audio data set). The audio data set is subdivided into sections and each section is evaluated to determine a probability that the section includes the particular speaking voice or voices. The probabilities can be normalized. The target display rate for each section can be established based upon the normalized probability for the section. For example, for sections having a very high probability that the particular speaker is speaking, the target display rate may be established as the normal display rate or even slowed down relative to the normal display rate. As the probability that a particular section includes the particular speaking voice or voices decreases, the target display rate can be made progressively greater. Thus, in sum, this method can produce a sequence of target display rates based upon whether a particular speaker or speakers are speaking. As can be appreciated, while this method has been described above as used to determine a sequence of target display rates from scratch, the method could also be used to modify a nominal target display rate (or sequence of rates) by increasing or decreasing the nominal target display rate based upon the determined probability that the section of audio data corresponding to the nominal target display rate includes the particular speaking voice or voices.

Covell and Withgott describe in detail other methods for using the analysis of an audio data set of a set of audiovisual data to affect the target display rate (i.e., to determine a target display rate or to modify a nominal target display rate). These methods can also be used with the present invention. In one such method, the magnitude of the stress with which the spoken portions of an audio data set are uttered is ascertained. (The magnitude of the stress of unspoken portions of the audio data set is considered to be zero.) Such stress can be ascertained, for example, by computing an energy term for the spoken portions. The target display rate of various portions of the audio data set can then be established (or the nominal target display rate or rates modified) in accordance with the relative magnitudes of stress ascertained for those portions. For example, the magnitude of the target display rate can be varied inversely with respect to the amount of stress with which a spoken portion of the audio data set is uttered. In another such method of Covell and Withgott, the magnitude of the speed with which the spoken portions of an audio data set are uttered is ascertained (unspoken portions have a speed of zero). The speaking speed can be ascertained, for example, from measurement of spectral changes in the speech. The relative magnitudes of speaking speed can be used to establish the target display rate of various portions of the audio data set (or to modify the nominal target display rate or rates). For example, the target display rate of spoken portions that were originally spoken rapidly is made relatively lower than the target display rate of other spoken portions. As further described by Covell and Withgott in yet another method, the ascertained magnitudes of speaking stress and speaking speed can be combined to produce an "audio tension" value, the audio tension value then being used to establish a target display rate or rates (or modify a nominal target display rate or rates) in any desired manner.

As indicated above, the video data of a set of audiovisual data can also be analyzed and a target display rate (or sequence of rates) established (i.e., determined from scratch or obtained by modifying a nominal target display rate) on the basis of that analysis. Several such methods of determining a target display rate are described in detail in the commonly owned, co-pending U.S. patent application entitled "A Method of Compressing a Plurality of Video Images for Efficiently Storing, Displaying and Searching the Plurality of Video Images," by Subutai Ahmad, Ser. No. 08/528,891, filed on Sep. 15, 1995, (hereafter referred to as "Ahmad"), the disclosure of which is incorporated by reference herein. In one such method, the video data is analyzed to ascertain the relative rate of change of the video data along various population-based dimensions (i.e., dimensions that are selected based upon an analysis of a specified population of the data). Linear (or affine) manifolds are one example of the implementation of such analysis. In a linear manifold, related n-dimensional sets of data (e.g., the pixels of a set of frames of video data) are monitored to determine the variation along each dimension (e.g., pixel) between "adjacent" sets (e.g., successive video frames) of data. A specified number of dimensions (e.g., particular pixels) having the greatest variation can be selected as the population-based dimensions. The change in values of the data (e.g., change in pixel values) along the population-based dimensions are monitored. The target display rate can be established based upon those changes. For example, the target display rate can be made relatively slower when the video data (along the population-based dimensions) changes rapidly and vice versa. In another method described in Ahmad, the video data is analyzed to ascertain portions of a video image that change quickly, as well as the frequency with which such quick changes occur. During periods when numerous such quick changes occur, the target display rate can be made relatively lower; during periods when the video image remains relatively stable, the target display rate can be made relatively higher.

Other methods for establishing a target display rate based upon analysis of the video data set are described in, for example, "A Real-Time System for Automatically Annotating Unstructured Image Sequences," by Zabih, Woodfill and Withgott, IEEE International Conference on Systems, Man, and Cybernetics, 1993, and "Tracking Non-Rigid Objects in Complex Scenes," by Huttenlocher, Noh and Rucklidge, International Conference on Computer Vision, 1993, the disclosures of which are incorporated by reference herein. In those methods, the motion of objects in the video image is tracked. The target display rate can be made relatively lower, for example, during periods of time in which new objects appear in the video image.

A target display rate can also be established by combining the results of multiple analyses of the audiovisual data. Generally, the multiple analyses can include analysis of the audio data only, the video data only, or both the audio and the video data. The results of the analyses can be combined in any suitable way. For example, the target display rate (or sequences of rates) established by multiple analyses can be averaged to establish a target display rate. Or, the faster or slower of the target display rates established by multiple analyses can be selected as the target display rate. Other non-linear filtering methods (such as stack filters) or time-variant methods (such as functions which include some temporal hysteresis) can also be used, as understood by those skilled in the art of data analysis, to establish a target display rate from multiple target display rates established by multiple analyses of the audiovisual data.

In step 103 of the method 100 (FIG. 1) described above, a modified set of audio data is created based upon the target display rate. The modified audio data set is created so that, when used to generate an audio display, the apparent display rate of the display approximates or is equal to the target display rate. Below, a particular method for producing such a modified audio data set is described in detail with respect to FIGS. 3A, 3B, 4A, 4B and 4C. The method described is a modification of the previously known synchronized overlap add (SOLA) method. The SOLA method, which can also be used to produce a modified audio data set, is described in more detail in a paper entitled "High quality time scale modification for speech," by S. Roucos and A. M. Wilgus, published in Proceedings of the International Conference on Acoustics, Speech, and Signal Processing, pages 493–496, IEEE, 1985, the disclosure of which is incorporated by reference herein.

Both the modified SOLA and the SOLA method can be used to produce a modified audio data set that results in a display having an apparent display rate that is either speeded up or slowed down with respect to the normal display rate. Further, both the modified SOLA and SOLA methods can produce a modified audio data set that generates an audio display having little or no distortion of the sound represented by the original audio data set. For example, these methods enable the audio display to be speeded up without producing a "chipmunk effect" when human voices are displayed, or slowed down without making speakers sound as though they are in a stupor. The modified SOLA method described below differs from the SOLA method described in the paper mentioned above principally in that the SOLA method allows segments to initially be overlapping while the modified SOLA method does not; aside from this difference, the two methods are, in principle, the same. Use of the modified SOLA method can be advantageous, as compared to use of the SOLA method, because the modified SOLA method results in a lower computational burden (the SOLA method requires, for example, more "bookkeeping" to keep track of the initially overlapping segments). Additionally, the modified SOLA method can produce less distortion than the SOLA method because the modified SOLA method retains more of the original audio data in an unmodified form. Those skilled in the art of data analysis will readily appreciate how the SOLA method can be used with the invention based upon the description of the modified SOLA method below; primarily, the use of the SOLA method requires that the steps of the modified SOLA method as described below be modified to account for the initial overlap of the segments.

Figure 3A:
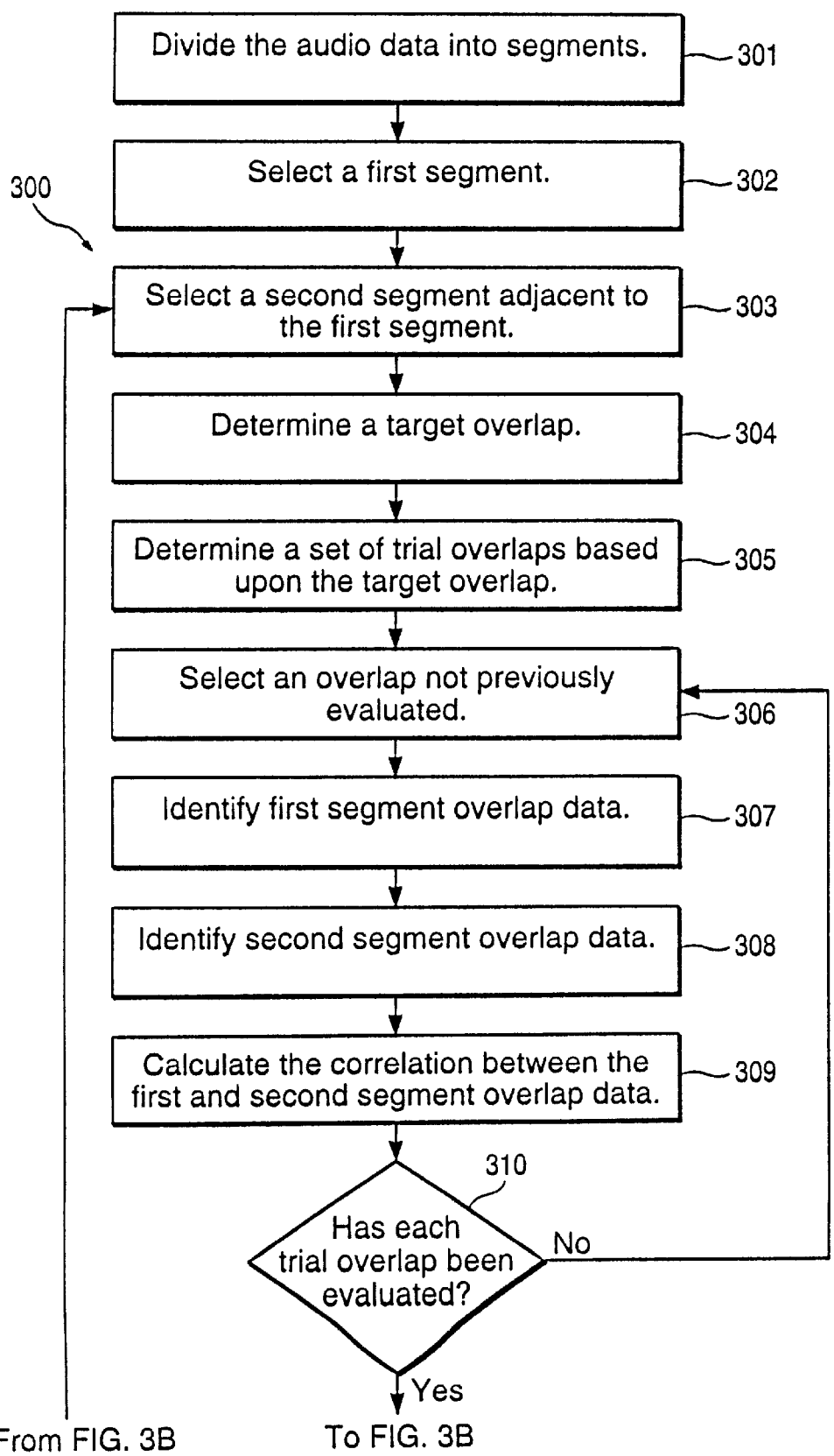
FIGS. 3A and 3B together are a flow chart of a method, according to an embodiment of the invention, for modifying a set of audio data in accordance with a target display rate.
Figure 3B:
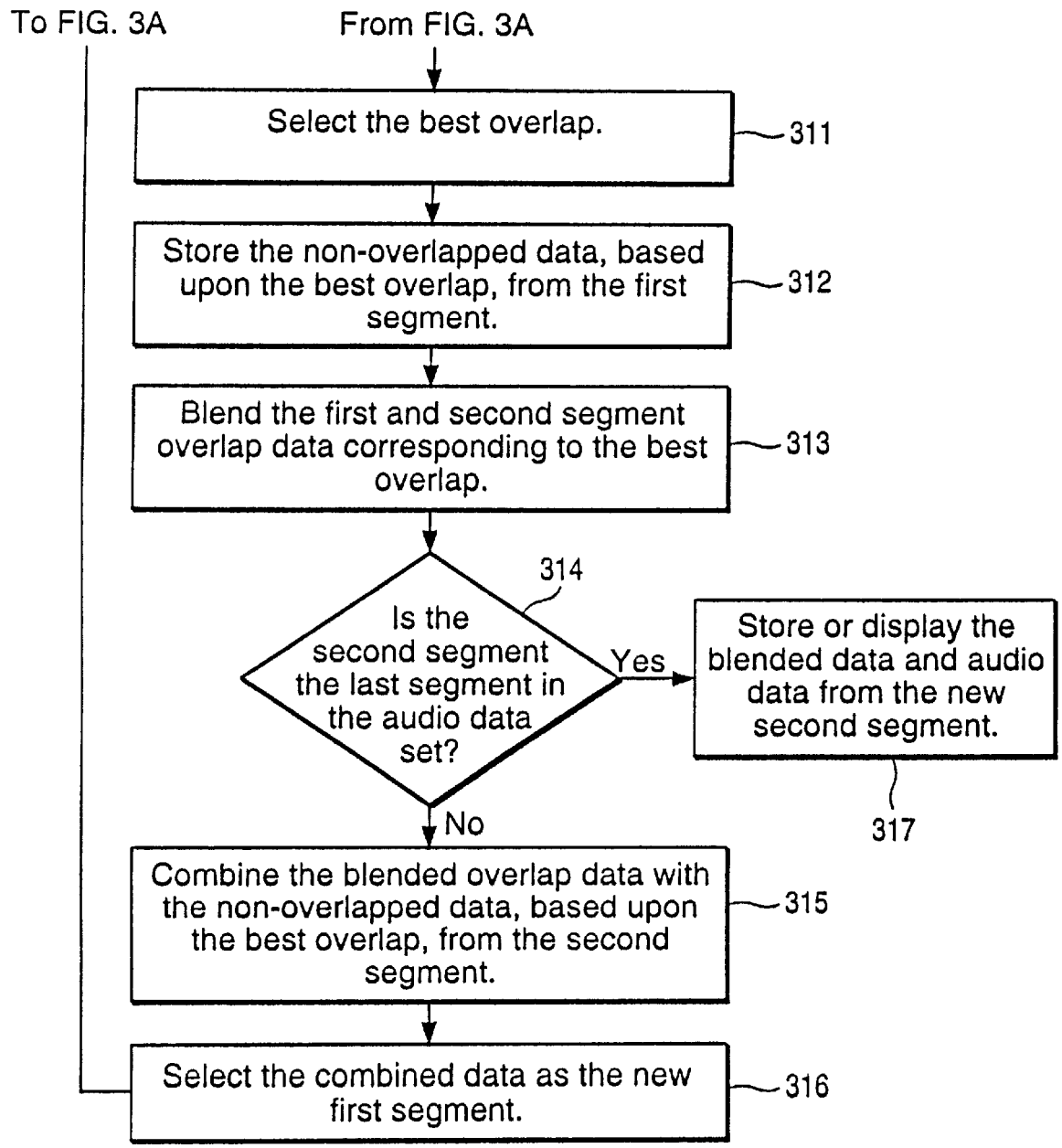
Figure 4A:
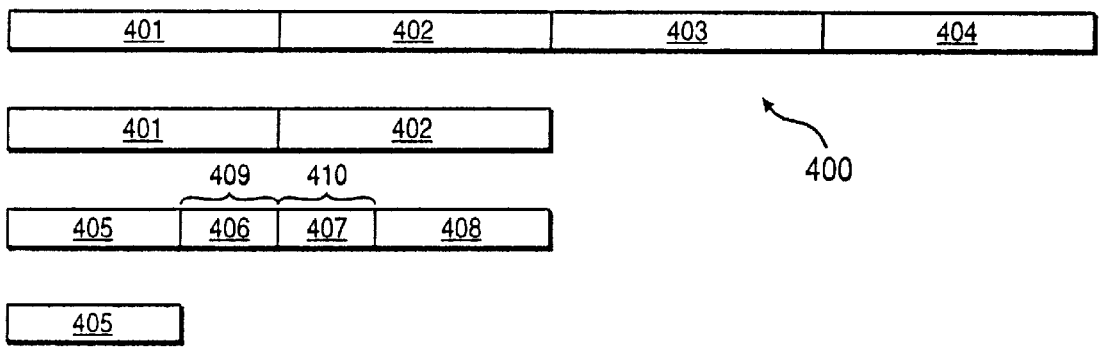
FIGS. 4A, 4B and 4C are diagrammatic representations of an audio data set including four segments, and the transformations of the audio data set that can occur during implementation of the method of FIGS. 3A and 3B to modify the audio data set so that the corresponding audio display is speeded up.
Figure 4B:
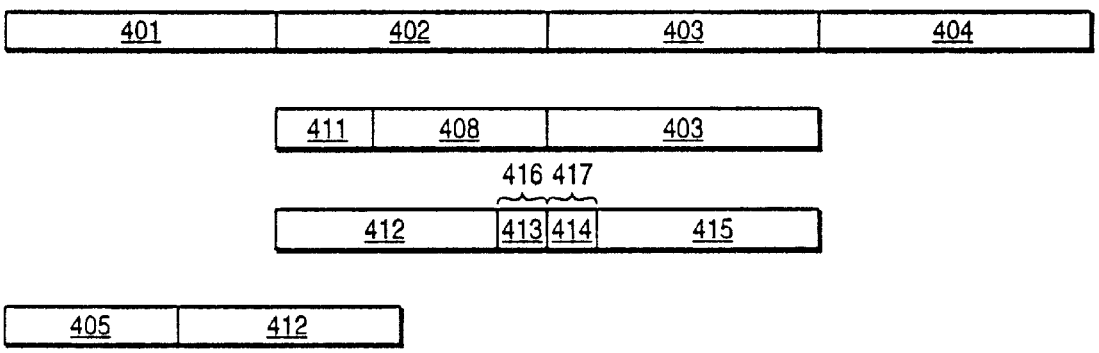
Figure 4C:
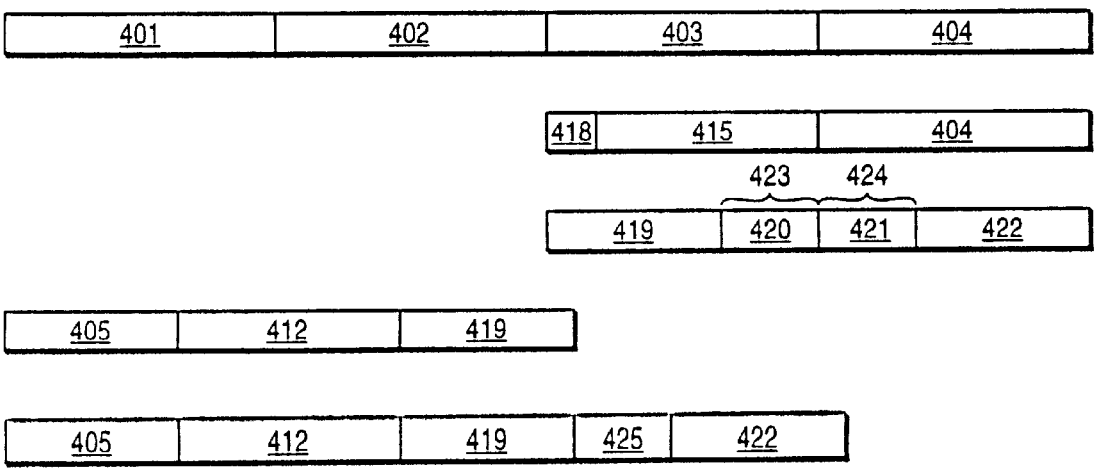

FIGS. 3A and 3B together are a flow chart of a method 300 (a modified SOLA method), according to an embodiment of the invention, for modifying a set of audio data in accordance with a target display rate. The method 300 can be used with any target display rate, either a target display rate intended to speed up the apparent display rate (i.e., when the target display rate is indicated as a number representing a multiple of the normal display rate, a target display rate greater than 1) or a target display rate intended to slow down the apparent display rate (i.e., a target display rate less than 1). FIGS. 4A, 4B and 4C are diagrammatic representations of an audio data set 400 and the transformations of the audio data set 400 that can occur during implementation of the method 300 to modify the audio data set 400 so that the corresponding audio display is speeded up (target display rate greater than 1).

Generally, the modified SOLA method of FIGS. 3A and 3B causes the beginning and end of each segment to be overlapped with the end and beginning, respectively, of adjacent segments. As will be better understood from the description below, the overlapping of segments can result in the addition of data to, elimination of data from and/or blending of data in the audio data set. (Note that, as explained and illustrated in more detail below, the "overlap" can be negative.) For display speedup, the audio data set is decreased in length by the sum of all of the overlap lengths (which will, typically, be predominately or exclusively positive). Correspondingly, for display slowdown, the audio data set is increased in length by the sum of the overlap lengths (which will, typically, be predominately or exclusively negative).

Speech sounds can be divided into two general classes: voiced and unvoiced. Voiced speech is produced as the response of the vocal tract to periodic excitation from vocal cords, which generates pitch pulses. Voiced speech includes the majority of speech sounds, such as the vowels, nasals, semivowels and voiced transients. Unvoiced sounds, which include the fricatives and the unvoiced stops, are created as the result of turbulence produced by a constriction somewhere along the vocal tract. While the method described here is best suited to modifying audio data representing voiced sounds, it performs well in modifying audio data representing both voiced and unvoiced sounds, especially in view of the manner and relative proportion in which such sounds appear in human speech.

The possible lengths of each overlap are constrained in accordance with the amount of display rate variation that is desired. However, within this constraint, the length of each particular overlap is chosen so that the pitch pulses of the overlapped portions closely approximate (i.e., overlie) each other (see FIGS. 5A, 5B and 5C, and FIGS. 6A, 6B and 6C, discussed below). Thus, the addition, elimination and/or blending of the audio data of the overlapped portions does not greatly distort the sound corresponding to the overlapped portions of audio data. As a result, the audio data set can be modified as desired (i.e., the apparent display rate of an audio data set can be varied as desired), while reducing the amount of distortion associated with the modification of the audio data set (i.e., the modified display sounds "normal"). In practice, the method 300 has been found to work well (i.e., produce an audio display with relatively little or no distortion) in varying the apparent display rate of an audio display that includes spoken and/or non-spoken audio.

In step 301, an audio data set is divided into segments of audio data (audio samples, in the discussion below) of equal time duration. Each audio segment preferably corresponds to a specified unit of video data having the same duration. For example, each audio segment can include audio samples spanning a duration of time that corresponds to a single video frame of video data, i.e., each audio segment of the audio data corresponds to a particular video frame of the video data. The segments do not overlap and there are no gaps between segments, i.e., the beginning of each segment (except for a beginning segment of the audio data set) is immediately adjacent to the end of a previous segment and the end of each segment (except for an end segment of the audio data set) is immediately adjacent to the beginning of a subsequent segment. In FIGS. 4A, 4B and 4C, the audio data set 400 is divided into segments 401 through 404. This is shown in the top row of each of FIGS. 4A, 4B and 4C.

In step 302, a first segment is selected. Typically, though not necessarily, the first segment selected in step 302 is a segment at either the beginning or end of the audio data set, e.g., the segment 401 or the segment 404, respectively, of the audio data set 400 of FIGS. 4A, 4B and 4C. (As can be appreciated, when the invention is implemented to vary the apparent display rate of an audiovisual display in real time, the first segment generally must be—given the processing speed capabilities of current devices for processing audiovisual data—the first temporally occurring segment, in order to maintain the real-time display.) In the description of the method 300 below, the first segment selected in step 302 is the segment at the beginning (i.e., temporally, the first occurring segment) of the audio data set (i.e., the segment 401 of the audio data set 400 in FIGS. 4A, 4B and 4C) and segments are processed successively according to the method 300 moving forward in time (i.e., from left to right in FIGS. 4A, 4B and 4C). However, as will be appreciated from the description below, the last segment could have been selected in the step 302 and the method 300 could be implemented moving backward in time (i.e., from right to left in FIGS. 4A, 4B and 4C) in a manner analogous to that described below.

In step 303, a second segment is selected (segment 402 in FIG. 4A). The second segment is temporally adjacent to, but does not overlap, the first segment. The first and second segments are shown in the second row of each of FIGS. 4A, 4B and 4C.

As indicated in the example discussed above, the division of an audio data set into exactly equal audio segments may result in audio segments having a fractional audio sample (e.g., in the example above, 266.67 audio samples). This difficulty can be addressed, as discussed above, by adjusting the number of audio samples in each segment to be an integer value such that, on average, each audio segment includes the exactly calculated number of audio samples. In steps 302 and 303, the integer numbers of audio samples are associated with the segments as the "lengths" of the segments.

In step 304, a target overlap of the first and second segments is determined. The target overlap represents an approximation of the actual overlap between adjacent portions of the first and second segments that is determined in later steps of the method 300. The magnitude of the target overlap is directly related to the target display rate; consequently, as more readily apparent from the description below, the apparent display rate produced by the method 300 closely approximates the target display rate. The target overlap can be determined according to the equation (1):

$$t=[(s-1)/s]*d \qquad (1)$$

where t is the target overlap (expressed in time or number of audio samples), s is the target display rate (a dimensionless quantity that, usually, is not equal to 1), and d is the duration of each segment (again,, expressed in time or number of audio samples). (Note that, here, d can be a non-integer value if expressed in audio samples.) As can be appreciated from considering equation (1), when the target display rate is greater than 1 (i.e., a speedup of the display is desired), the target overlap is greater than zero. Conversely, when the target display rate is less than 1 (i.e., a slowdown of the display is desired), the target overlap is less than zero.

In step 305, a set of trial overlaps is determined based upon the target overlap. As explained in more detail below, each of the trial overlaps is evaluated to determine which trial overlap works best, e.g., which trial overlap results in modification of the original audio data set with least distortion to the sound produced by the modified audio data set. As can be appreciated, then, the granularity of the trial overlaps (i.e., the amount by which each trial overlap differs from the trial overlap(s) having the next closest magnitude) and the range of trial overlaps can affect the quality of the determination of the best overlap. In general, as the trial overlaps become more finely grained, the quality of the determination of the best overlap increases because more trial overlaps are evaluated for a given range of trial overlaps. Generally, as the range of trial overlaps increases, the quality of the determination of the best overlap increases because more trial overlaps are evaluated for a given granularity. Preferably, the range of trial overlaps is at least large enough to include one pitch pulse of the lowest frequency pitch expected to be encountered in the audio data (e.g., if the lowest frequency pitch has a frequency of 80 hz, such that the pitch pulse is 12.5 milliseconds, and the sampling rate is 8000 samples per second, the range of trial overlaps is preferably at least 100 audio samples in length), since, usually, superposing pitch pulses from overlapping portions of the segments can be found within that range. However, as more trial overlaps are evaluated, the amount of time required to evaluate all of the trial overlaps increases. Additionally, evaluating a wider range of trial overlaps generally increases the chance of determining a best overlap that differs significantly from the trial overlap; if this occurs often enough, the apparent display rate can vary significantly from the target display rate (however, as discussed further below, this problem can be overcome by continually monitoring the actual apparent display rate and modifying the target display rate as necessary to cause the apparent display rate to converge to the target display rate). The granularity and range of the trial overlaps are chosen as a tradeoff between the computational time required and the expected quality of the best overlap produced. Illustratively, for an audio sampling rate of 8000 samples per second, the range of trial overlaps can be 100 audio samples long and the granularity can be one audio sample, i.e., 101 trial overlaps are evaluated.

Preferably, the range of trial overlaps is centered about the target overlap so that, despite the fact that the actual overlap of any two segments can vary from the target overlap, the average actual overlap will tend to equal the target overlap as the number of segments becomes large. The closer the average actual overlap is to the target overlap, the closer the apparent display rate produced by the method 300 is to the target display rate. (However, the produced apparent display rate can also be monitored to enable the target display rate to be varied to cause the produced apparent display rate to remain approximately equal to the target display rate, as mentioned above and described in detail below.)

In step 306, a trial overlap that has not previously been considered is selected. The trial overlaps can be evaluated in any order.

In step 307, the audio data at the end of the first segment that falls within the overlap is identified as first segment overlap data. This is shown, for example, in the third row of each of FIGS. 4A, 4B and 4C, i.e., in FIG. 4A, a set of first segment overlap data 406 is shown.

In step 308, the audio data at the beginning of the second segment that falls within the overlap is identified as second segment overlap data. This is also shown, for example, in the third row of each of FIGS. 4A, 4B and 4C, i.e., in FIG. 4A, a set of second segment overlap data 407 is shown.

When two segments are overlapped, there will be not only segment overlap data (as described above), but also non-overlapped data. Non-overlapped data is also shown in the third row of each of FIGS. 4A, 4B and 4C. For example, in FIG. 4A, first segment 401 includes non-overlapped data 405, while second segment 402 includes non-overlapped data 408.

In step 309, the correlation between the first segment overlap data and second segment overlap data is calculated.

Any appropriate method of calculating a correlation between the first segment overlap data and second segment overlap can be used. In one embodiment, the correlation is determined as the mean cross-product of corresponding audio data from the first segment overlap data (after the mean value of the first segment overlap data has been subtracted from each of the first segment overlap data) and the second segment overlap data (after the mean value of the second segment overlap data has been subtracted from each of the second segment overlap data). Let $N_1$ and $N_2$ be the amount of data in the first and second segments, respectively. Let M be the amount of data that is added to the first segment from the second segment to accommodate negative overlaps, if necessary, as described above. (Note that it may also be necessary to add additional data to the second segment if, for example, the range of overlaps is greater than the length of the second segment; however, as discussed below, that eventuality is believed to be unlikely in typical applications of the invention.) Let the amplitude of the audio data in the first segment be represented by a[1], a[2], ..., a[$N_1$+M] (where M is zero, if no data has been added to the first segment) and the amplitude of the audio data in the second segment be represented by b[1], b[2], ..., b[$N_2$]. Let k be the amount of audio data in a trial overlap, (2r+1) be the length of the range of trial overlaps (so that there are r pieces of audio data on either side of the trial overlap) and d be the target overlap. The mean values of the first and second segment overlap data for a trial overlap are given by equations (2) and (3), respectively:

$$a'=(a[N_1-k+1]+a[N_1-k+2]+ \ldots +a[N_1+M])/(k+M) \quad (2)$$

$$b'=(b[1]+b[2]+ \ldots +b[k+M])/(k+M) \quad (3)$$

The correlation measure, C, is then given by equation (4):

$$C=\{(a[N_1-k+1]-a')*(b[1]-b')+(a[N_1-k+2]-a')*(b[2]-b')+ \ldots +(a[N_1+M]-a')*(b[k+M]-b')\}/(k+M) \quad (4)$$

It may be desirable to modify the correlation calculation to weight the calculated correlation for each trial overlap according to the proximity of the trial overlap to the target overlap. The correlation measure, C, is then given by equation (5):

$$C = W(d, k, r) * \{(a[N_1 - k + 1] - a') * (b[1] - b') + \qquad (5)$$
$$(a[N_1 - k + 2] - a') * (b[2] - b') + \ldots +$$
$$(a[N_1 + M] - a') * (b[k + M] - b')\} / (k + M)$$

where W(d, k, r) is a weighting factor that is a function of the particular trial overlap, k, the target overlap, d, and one half the length of the range of trial overlaps, r. Any appropriate weighting function can be used. For example, the weighting function could be as given in equation (6):

$$W(d, k, r)=1-|k-d|/r \quad (6)$$

As can be appreciated from consideration of equation (6), such weighting function is equal to zero at either end of the range of trial overlaps (since |k−d| equals r for those overlaps) and is equal to 1 for the target overlap (since |k−d| is equal to zero for that overlap). The weighting function increases linearly between the each end of the range of overlaps and the target overlap.

In step 310, a determination is made as to whether each trial overlap has been evaluated. The step 310 is used to determine when the comparison of overlapping portions of adjacent segments is to end. If one or more trial overlaps still remain to be evaluated, then the method 300 returns to step 306 for selection of another trial overlap to evaluate and steps 307 through 309 are performed again. The method 300 iterates through steps 306 through 309 until all trial overlaps have been evaluated. Once all trial overlaps have been evaluated, the method 300 continues with the step 311.

In step 311, the best overlap is selected. The best overlap is the overlap having the highest correlation measure between the audio data of the first segment overlap data and the audio data of the second segment overlap data, e.g., the highest mean cross-product (described above). If more than one trial overlap has the highest correlation measure, then the trial overlap that is closest to the target overlap is selected. If there are two such trial overlaps that are closest, either can be chosen arbitrarily, or, in accordance with a method according to the invention in which the actual apparent display rate is monitored (described below), the trial overlap that will cause the actual apparent display rate to become closer to the target display rate is chosen. Note that the best overlap can be either positive or negative. Further, this is true for both a target display rate greater than 1 (display speedup) and less than 1 (display slowdown). However, for display speedup, typically the best overlap will be positive and, for display slowdown, typically the best overlap will be negative; in both cases, ideally, the best overlap is close in magnitude to the target overlap. To facilitate the description and illustration of the invention, the third line of FIGS. 4A, 4B and 4C will be assumed to show the best overlap for the first and second segments of those Figures. For example, in FIG. 4A, the best overlap is indicated in the first segment by the numeral 409 and in the second segment by the numeral 410.

In step 312, the non-overlapped data, based upon the best overlap, from the first segment is stored. The stored non-overlapped data from the first segment is shown in the fourth row of each of FIGS. 4A, 4B and 4C. For example, in FIG. 4A, the non-overlapped data 405 is stored. Note that, if the best overlap is negative (as it typically will be for display slowdown), the non-overlapped data includes more than the audio data from the first segment; the non-overlapped data also includes some audio data that was initially part of the second segment (and, perhaps, in an extreme slowdown case, subsequent segments).

In step 313, the first segment overlap data corresponding to the best overlap is blended with the second segment overlap data corresponding to the best overlap. As can be seen in the fifth row of each of FIGS. 4A, 4B and 4C, the blended audio data replaces the second segment overlap data in the second segment. For example, in FIG. 4A, after blending, the second segment 402 includes blended data 411 and non-overlapped data 408. The first segment overlap data and second segment overlap data are discarded. Thus, in FIG. 4A, the blended data replaces the first and second segment overlap data, thereby reducing the size of the audio data set 400 by the amount of the overlapped data (i.e., the size of the first segment overlap data or, equivalently, the jack second segment overlap data).

The blending can be accomplished using any appropriate technique that produces a smooth transition between the end of the first segment overlap data and the beginning of the second segment overlap data. For example, the blending can be accomplished by performing a linear cross fade of the first segment overlap data with the second segment overlap data that produces a weighted combination of the data in the first and second overlap segments. The weighting of the first segment overlap data is decreased linearly from 1 at the beginning of the first segment overlap data (i.e., the audio data adjacent to the non-overlapped data of the first segment) to 0 at the end of the first segment overlap data (i.e., the audio data adjacent to the second segment overlap data). Correspondingly, the weighting of the second segment overlap data is increased linearly from 0 at the beginning of the second segment overlap data (i.e., the audio data adjacent to the first segment overlap data) to 1 at the end of the second segment overlap data (i.e., the audio data adjacent to the non-overlapped data of the second segment). The linear cross fade of the first and second segment overlap data is given by the equation (7):

$$g[i]=(i/(k+M))*b[i]+(1-(i/(k+M)))*a[N_1-k+i] \text{ for } i=1, 2, \ldots, (k+M) \quad (7)$$

where $N_1$ is the number of samples originally in the first segment; M is the number of samples that have been added, if any, to extend the length of the first segment to accommodate negative overlaps; k (here) is the best overlap; (k+M) is the number of samples, for the best overlap, that overlap between the extended first segment and the second segment; $a[N_1-k+1]$, $a[N_1-k+2]$, . . . , $a[N_1+M]$ are the (k+M) last samples of the extended first segment a; b[1], b[2], . . . , b[k+M] are the (k+M) first samples of the second segment b; and g[1], g[2], . . . , g[k+M] are the (k+M) samples of the blended data g.

In step 314, a determination is made as to whether the second segment is the last segment in the audio data set.

The step 314 is used to determine when the method 300 is to end (i.e., when all of the audio data set has been modified) and is discussed in more detail below.

In step 315, the blended data is combined with the non-overlapped data of the second segment to form a modified second segment. This combination is shown in the fifth row of each of FIGS. 4A, 4B and 4C. For example, as mentioned above, in FIG. 4A, after blending, the second segment 402 includes blended data 411 and non-overlapped data 408. At this point, the overlapping of the first two segments of the audio data set is complete and a new set of segments can be overlapped.

Typically, when the target overlap is positive (i.e., when it is desired to speed up the apparent display rate so that the target display rate is greater than one), the first and second segments are overlapped in accordance with each of the trial overlaps simply by moving the second segment in time toward the first segment by an amount equal to the trial overlap (i.e., from right to left in FIGS. 4A, 4B and 4C). Each trial overlap moves the second segment a different amount with respect to the first segment.

Figure 5A:
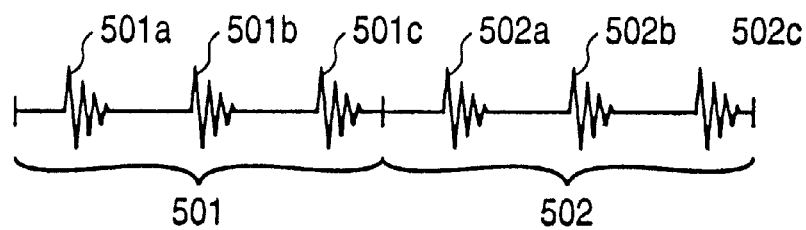
FIGS. 5A, 5B and 5C illustrate overlap of segments where all of the trial overlaps are positive.
Figure 5B:
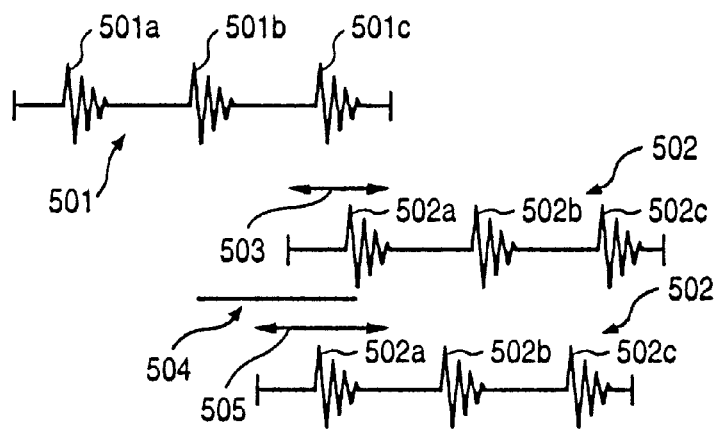
Figure 5C:
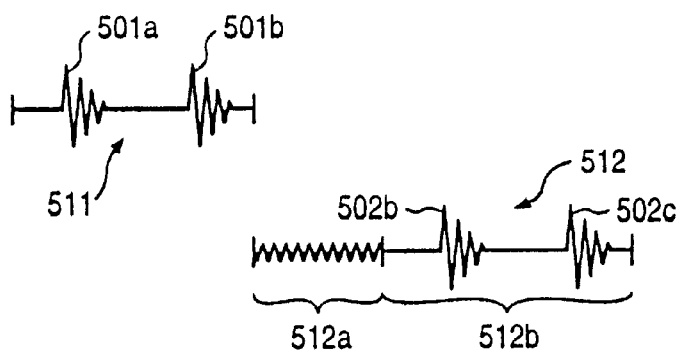

FIGS. 5A, 5B and 5C illustrate overlap of segments where all of the trial overlaps are positive. In FIG. 5A, adjacent segments 501 and 502 are shown. Segment 501 includes pitch pulses 501a, 501b and 501c, while segment 502 includes pitch pulses 502a, 502b and 502c.

In FIG. 5B, the overlap of the segments 501 and 502 is illustrated. Segment 502 is shown in two positions: the upper position corresponds to the target overlap 503, while the lower position corresponds to the best overlap 505. The range 504 of overlaps is also shown. FIG. 5B illustrates how the best overlap 505 can result from "matching" of pitch pulses in adjacent segments: in the lower position of the segment 502, the pitch pulse 502a of the segment 502 overlies the pitch pulse 501c of the segment 501. (Note that, conceptually, when the segments 501 and 502 overlap, the overlapping portions overlie each other; for clarity of illustration, in FIG. 5B, the segments 501 and 502 are displaced in a vertical direction from each other.)

In FIG. 5C, the portion of the segment 501 that is retained in the modified audio data set is shown as segment 511. The segment 512 represents a modified second segment 502: the section 512a represents the blending of the overlapping portions of the segments 501 and 502, while the section 512b represents the non-overlapping portion of the segment 502, including the pitch pulses 502b and 502c. (The section 512a is represented as shown in FIG. 5C to indicate that the section 512a is produced by blending data; the representation is not intended to reflect the audio data content of the section 512a.)

If, for example, the pitch of a spoken sound is 90 hz, each audio segment corresponds to a video frame, and the video frame rate is 30 hz, then each audio segment will include 3 pitch pulses, as shown in FIGS. 5A, 5B and 5C. A spoken vowel sound may last, for example, for approximately ⅓ of a second. For the above pitch frequency and audio segment length, such a spoken vowel sound will include 30 pitch pulses and span 10 audio segments. Since each pitch pulse corresponding to such a vowel sound will be much like the other pitch pulses of that vowel sound, it can be readily appreciated that the 10 audio segments corresponding to that vowel sound can be overlapped as shown in FIGS. 5A, 5B and 5C (i.e., so that pitch pulses from adjacent segments overlie each other), even by a very large amount, without producing significant (or, perhaps, any) distortion of that sound. Such distortion as is produced from the use of such an overlapping method will often arise from overlapping segments including pitch pulses from different sounds (i.e., successive different vowel sounds, successive different consonant sounds or successive vowel and consonant sounds).

One or more trial overlaps can be negative. Negative overlap can occur in several situations. For example, when display slowdown (target display rate less than 1) is desired, the target overlap is negative (excepting, perhaps, some instances in which real-time adjustment of the target overlap, as described elsewhere herein, produces a positive target overlap to cause the actual apparent display rate to more closely approximate the target display rate). When the target overlap is negative, usually most, and often all, of the trial overlaps are negative as well.

Figure 6A:
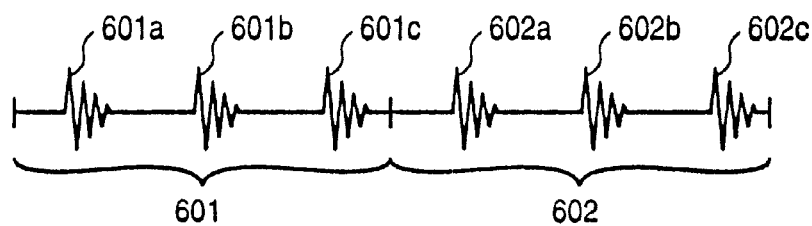
FIGS. 6A, 6B and 6C illustrate overlap of segments where all of the trial overlaps are negative.
Figure 6B:
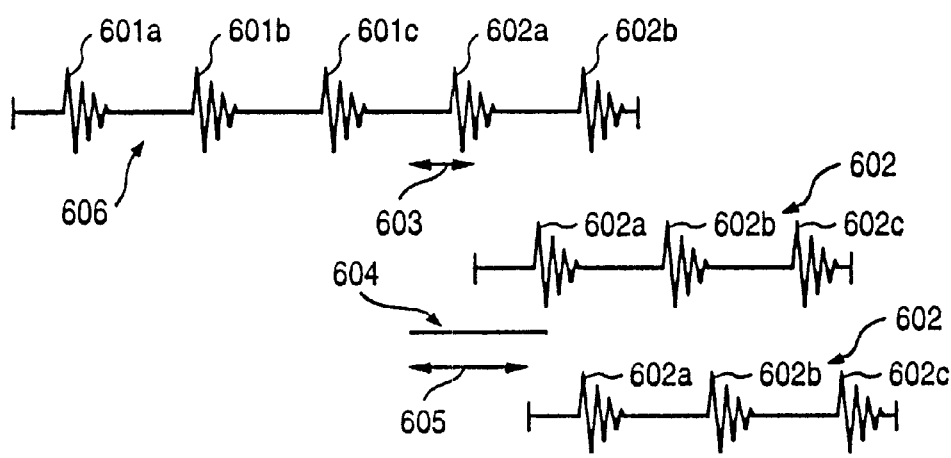
Figure 6C:
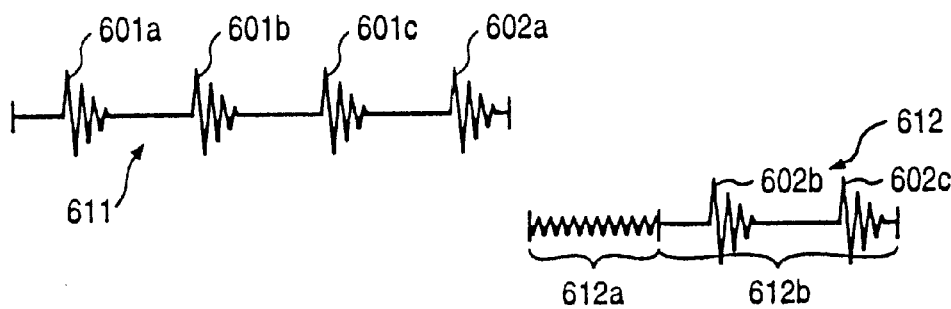

FIGS. 6A, 6B and 6C illustrate overlap of segments where all of the trial overlaps are negative. In FIG. 6A, adjacent segments 601 and 602 are shown. Segment 601 includes pitch pulses 601a, 601b and 601c, while segment 602 includes pitch pulses 602a, 602b and 602c.

In FIG. 6B, the overlap of the segments 601 and 602 is illustrated. Segment 602 is shown in two positions: the upper position corresponds to the target overlap 603, while the lower position corresponds to the best overlap 605. The range 604 of overlaps is also shown. As can be seen in FIG. 6B, negative overlap causes the second segment 602 to be moved away from the first segment 601 (i.e., to the right in FIG. 6B), thus producing a gap between the end of the first segment and the beginning of the second segment 602. In order to overlap the segments 601 and 602, audio data must be added to the end of the segment 601. This is accomplished by adding data from the beginning of the second segment 602 to the end of the first segment 601 to create an extended first segment 606. The amount of data added to the first segment 601 is an amount equal to at least one audio sample more than the amount by which the most negative overlap extends from the end of the first segment 601 into the second segment 602 (to ensure that there is at least some overlap between the extended first segment 606 and the second segment 602 for all overlaps). Like FIG. 5B, described above, FIG. 6B illustrates how the best overlap 605 can result from "matching" of pitch pulses in the segments: in the lower position of the segment 602, the pitch pulse 602a of the segment 602 overlies the pitch pulse 602b of the extended segment 606.

In FIG. 6C, the portion of the extended segment 606 that is retained in the modified audio data set is shown as segment 611. The segment 612 represents a modified second segment 602; the section 612a represents the blending of the overlapping portions of the extended segment 606 and the segment 602, while the section 612b represents the non-overlapping portion of the segment 602, including the pitch pulses 602b and 602c.

Figure 7:
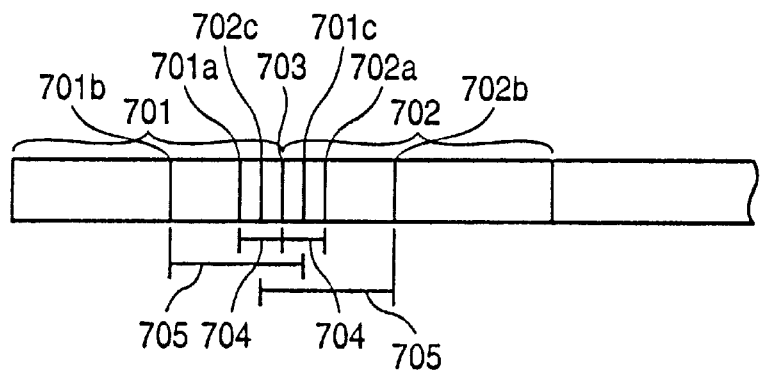
FIG. 7 illustrates a range of trial overlaps, including a positive target overlap and some negative overlaps.

As indicated above, negative overlap can occur in other situations. For example, for target overlaps greater than zero, the magnitude of the target overlap, the magnitude of the range of overlaps and the position of the range with respect to the target overlap can combine to produce one or more negative trial overlaps. FIG. 7 illustrates this situation. A target overlap 704, measured from a point 703 at which the first segment 701 adjoins the second segment 702, extends to a point 701a in a first segment 701 and a point 702a in a second segment 702. A range of trial overlaps is centered about the target overlap 704. The range has a length 705 and extends on either side of the trial overlap 704 to points 701b and 701c "in" the first segment 701 and to points 702b and 702c "in" the second segment 702. The magnitude of the target overlap 704, the length 705 of the range and the position of the range relative to the target overlap 704 is such that some overlaps (negative overlaps) within the range of trial overlaps will cause the first segment 701 and second segment 702 to be positioned so that the segments 701 and 702 do not, in fact, overlap each other. (This can be seen by observing in FIG. 7 that the points 701c and 702c that are "in" the first segment 701 and second segment 702, respectively, actually lie outside of the segments 701 and 702, respectively.) In a situation as shown in FIG. 7, the positive overlaps can be evaluated in a manner as illustrated in FIGS. 5A, 5B and 5C, and the negative overlaps can be evaluated in a manner as illustrated in FIGS. 6A, 6B and 6C.

If the absolute value of one or more negative overlaps is greater than the length of the second segment (which can occur, for example, when the target display rate is less than 0.5), then additional audio data from the audio data set that is beyond the second segment can be added to the first segment, as necessary. (Note that, in practice, target display rates below 0.5 are uncommon, since, at such low display rates, the quality of the audio display is unacceptably degraded.)

Depending upon the value of the target overlap, the size of the range of overlaps, and the location of the range of overlaps relative to the target overlap, special cases can arise that necessitate modifications to the general approach described above. Some such special situations and ways of handling them are discussed below.

Figure 8A:
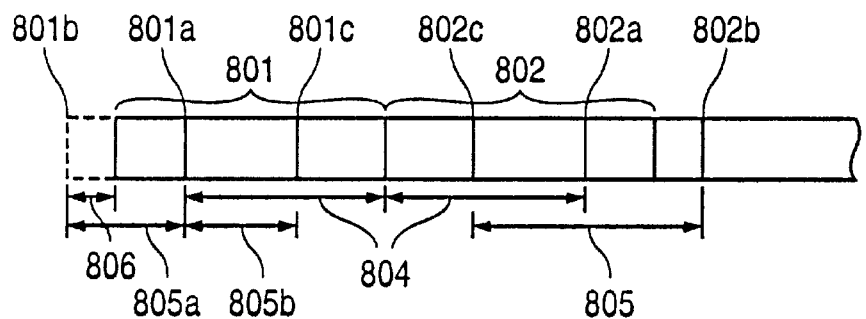
FIG. 8A illustrates another range of trial overlaps that require special handling in the method of FIGS. 3A and 3B.
Figure 8B:
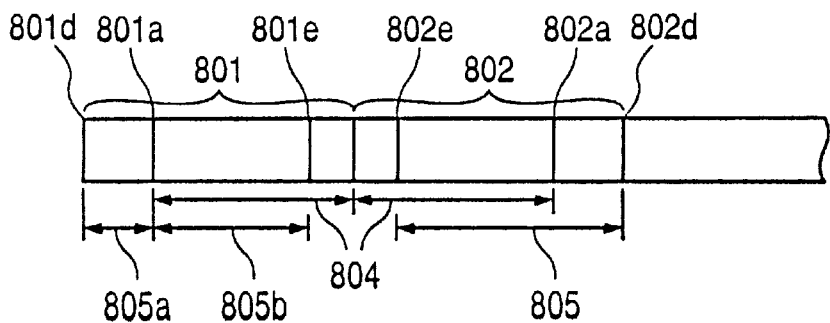
FIG. 8B illustrates a way in which the situation shown in FIG. 8A can be addressed.

For example, for target overlaps greater than zero, the magnitude of the target overlap, the magnitude of the range of overlaps and the position of the range with respect to the target overlap can combine to produce one or more trial overlaps that cause the beginning of the second segment to be moved to extend before the beginning of the first segment (i.e., overlap greater than the length of the first segment). FIG. 8A illustrates this situation, while FIG. 8B illustrates a way that the situation can be addressed. As shown in FIG. 8A, a target overlap 804 extends to a point 801*a* in a first segment 801 and a point 802*a* in a second segment 802. A range of trial overlaps is centered about the target overlap 804. The range has a length 805 and extends for equal distances 805*a* and 805*b* on either side of the trial overlap 804, to points 801*b* and 801*c* "in" the first segment 801 and to points 802*b* and 802*c* "in" the second segment 802. The magnitude of the target overlap 804 and the distance 805*a* is such that the point 801*b* extends beyond the first segment 801 by a distance 806 so that some overlaps within the range of trial overlaps will cause the second segment 802 to be positioned before the beginning of the first segment 801. This creates a problem, since there is no data in the first segment 801 that can correspond to the part of the second segment 802 that extends before the first segment 801.

As shown in FIG. 8B, this difficulty can be overcome by shifting the range of overlaps by a distance 806 so that the range of overlaps extends between points 801*d* and 801*e* in the first segment 801 and between points 802*d* and 802*e* in the second segment 802. However, while this overcomes the problem illustrated in FIG. 8A, and the same number of overlaps is still considered (which is desirable to improve the quality of the determination of the best overlap), the range of overlaps is no longer centered about the target overlap 804: the distances 805*a* and 805*b*, for example, have been shortened and lengthened, respectively, by an amount equal to the distance 806. This "unbalancing" of the trial overlaps may increase the likelihood that, and degree to which, the average actual overlap will deviate from the target overlap and, therefore, that the produced apparent display rate will deviate from the target display rate.

Alternatively, some of the trial overlaps can be removed from consideration. For example, a number of overlaps equal in amount to the length 806 can be eliminated from both ends of the range of trial overlaps. This approach has the advantage that the range of overlaps remains centered about the target overlap, thus increasing the likelihood that the apparent display rate produced by the method 300 will match the target display rate.

Additionally, it is possible that the range of trial overlaps is greater than the length of each segment. (It is believed, however, that it is preferable—and will also be typical—that the magnitude of the range of trial overlaps be specified so that this does not occur: typically, a segment will have a length of several pitch pulses and, as indicated above, the range of trial overlaps will be a little longer than one pitch pulse.) In that case, data can be added to the first segment, as described above, and additional data can be added to the second segment from the audio data that occurs after the end of the second segment. It may also be necessary to shift the range of overlaps so that the range is not centered about the target overlap, as also described above, or remove some overlaps from the range of overlaps, as also described above.

Returning to FIGS. 3A and 3B, in step 316, the modified second segment is selected as a new first segment for the next overlapping. To reiterate a point made above in a slightly different way, the significance of using the modified second segment from the previous overlapping as the first segment of the current overlapping, rather than using the unmodified second segment, is that the blended data smooths the region in which audio data is removed, so that sound distortion resultant from the removal of audio data is minimized.

After selection of the new first segment, the method 300 then returns to step 303 for selection of a new second segment that is temporally adjacent to, but does not overlap, the new first segment. As indicated above, the first and second segments are shown in the second row of each of FIGS. 4A, 4B and 4C. In particular, in FIG. 4B, after the segment 401 and segment 402 have been overlapped, the first segment is the modified segment 402 from FIG. 4A (including the blended data 411 and the non-overlapped data 408) and the second segment is the segment 403 (unmodified) of the audio data set 400.

The steps 304 through 316 are performed again to blend the end of the modified segment 402 with the beginning of the segment 403. In the third row of FIG. 4B, the best overlap of the modified segment 402 and the segment 403 is shown. The best overlap is designated by the numeral 416 in the modified segment 402 and by the numeral 417 in the segment 403. For the best overlap, the modified segment 402 includes non-overlapped data 412 and first segment overlap data 413, and the segment 403 includes non-overlapped data 415 and second segment overlap data 414. The non-overlapped data 412 of the modified segment 402 is stored is with the previously stored non-overlapped data 405 from the first segment 401, as shown in the fourth row of FIG. 4B. (Note that the non-overlapped data 412 of the modified segment 402 includes the blended data 411.) The first segment overlap data 413 is blended with the second segment overlap data 414 to produce the blended data 418. Thus, the size of the audio data set 400 is further reduced by the amount of the overlap of the modified segment 402 and the segment 403 (i.e., overlap 416 in the modified segment 402 or, equivalently, overlap 417 in the segment 403). As shown in the fifth row of FIG. 4B, the blended data 418 is combined with the non-overlapped data 415 from the segment 403 to produce a modified segment 403.

As shown in the second row of FIG. 4C, the overlapping of the segments 403 and 404 of the audio data set 400 begins with the selection of the modified segment 403 as the first segment and the segment 404 as the second segment (this is also shown in the fifth row of FIG. 4B). Once again, steps 304 through 316 are performed to blend the end of the modified segment 403 with the beginning of the segment 404. In the third row of FIG. 4C, the best overlap (designated by the numeral 423 in the modified segment 403 and by the numeral 424 in the segment 404) of the modified segment 403 and the segment 404 is shown. For the best overlap, the modified segment 403 includes non-overlapped data 419 and first segment overlap data 420, and the segment 404 includes non-overlapped data 422 and second segment overlap data 421. The non-overlapped data 419 of the modified segment 403 is stored with the previously stored non-overlapped data 405 from the first segment 401 and the non-overlapped data 412 from the modified segment 402, as shown in the fourth row of FIG. 4C. (Again, note that the non-overlapped data 419 of the modified segment 403 includes the blended data 418.) The first segment overlap data 420 is blended with the second segment overlap data 421 to produce the blended data 425, thus further reducing the size of the audio data set 400 by the amount of the overlap of the modified segment 403 and the segment 404 (i.e., overlap 423 in the modified segment 403 or, equivalently, overlap 424 in the segment 404).

Returning to FIGS. 3A and 3B, in step 314, a determination is made as to whether the second segment of the two segments being overlapped is the last segment in the audio data set. If so, then, in step 317, the blended data produced from the first segment overlap data and the second segment overlap data is stored along with the non-overlapped data from the second segment. This is shown in the fifth row of FIG. 4C: the blended data 425 and the non-overlapped data 422 are stored with the non-overlapped data 405, 412 and 419 to form the modified audio data set 400. The modified audio data set 400 is shorter than the original audio data set 400 by the cumulative amount of the best overlaps determined above.

In the description of the method 300 above, the data of the modified audio data set 400 is said to be "stored" as that data is identified. In this context, "stored" need not mean permanent storage in a non-volatile data storage device such as a hard disk, but, rather, can mean simply that the data is temporarily stored (e.g., in a random access memory) prior to being used to generate a display. Generally, once a corresponding video frame of the modified video data set has been determined to accompany an audio segment of the modified audio data set, as described below, such audio segment and video frame can be presented to the appropriate display devices for generation of a display. This is so since the determination of the "stored" data of the modified audio and video data sets is not affected by data from the original audio and video data sets that is relatively far into the future. Moreover, since the calculations for determining modified audio and video data can be done just prior to generating a display from that data, the calculations can be done based on a very recently determined (e.g., specified in real time by a user) target display rate. Additionally, the quantity of calculations required by the method 300 for typical amounts of audio and video data (see the illustrative numbers discussed above) can be performed by current processing devices sufficiently quickly to enable generation of a real-time display from the modified audio and video data. Thus, as can be appreciated from the above, the invention can enable the apparent display rate of an audiovisual display to be varied in real time.

Above, a particular method of modifying a set of audio data to vary the apparent display rate of an audio display is described. It is to be understood that, generally, other methods for so modifying an audio data set can be used with the invention. For example, methods based on Fast Fourier Transforms (FFTs) or analysis/synthesis systems can also be used. A discussion of other such methods is included in the paper entitled "Non-parametric techniques for pitch-scale and time-scale modification of speech," by E. Moulines and J. Laroche, published in Speech Communication, Volume 16, pp. 175–205, 1995, the disclosure of which is incorporated by reference herein.

As indicated above, the method 300 may not produce an apparent display rate that exactly matches the target display rate, particularly over short periods of display time. The same may be true of other methods that can be used with the invention to vary the apparent display rate of an audiovisual display. Typically, any deviation of the actual apparent display rate from the target display rate will disappear or become inconsequential over a sufficiently long period of time. For example, when the method 300 is used to produce a modified audio data set to cause the apparent display rate of an audiovisual display to be varied, the actual apparent display rate will typically closely approximate the target display rate over periods of a half second or more, but may produce significant deviations over periods of 30 milliseconds or so. Such short term fluctuations are typically not perceptible to a user; thus, generally, such "tracking error" is not a significant concern.

However, if desired, the apparent display rate produced by a method of the invention can be monitored, and, if the apparent display rate deviates from the target display rate by more than a predetermined amount, the target display rate can be appropriately modified to increase the likelihood that the produced apparent display rate will more closely approximate the specified target display rate. For example, if the apparent display rate being produced by a method in accordance with the invention is less than the specified target display rate, the target display rate can be increased. While the magnitude of the subsequently produced apparent display rate may remain the same (or even decrease), it is more likely that the apparent display rate will begin to increase. The target display rate can be modified by any desired amount. A relatively large modification in the target display rate will, typically, bring the apparent display rate in line with the specified target display rate relatively quickly. However, a relatively small modification is likely to adjust the apparent display rate more smoothly than a relatively large adjustment, thereby making the adjustment more transparent to an observer of the display. The modification of the target display rate can be made for a period of time according to any appropriate criterion, such as, for example, for a specified period of time, until the apparent display rate deviates from the initially specified target display rate by less than the predetermined amount, until the apparent display rate deviates from the initially specified target display rate by less than a second predetermined amount that is less than the first predetermined amount, or until the apparent display rate is equal to the initially specified target display rate. Further, the duration of time for which the target display rate is modified can depend upon the magnitude of the modification to the target display rate. Many approaches to modifying the target display rate to minimize or eliminate deviation of the apparent display rate from an initially specified target display rate are possible, as can be appreciated by those skilled in the art, and are within the ambit of this aspect of the invention.

As indicated above with respect to step 104 of the method 100 (FIG. 1), any appropriate method for creating a modified video data set from a modified audio data set can be used. For example, as also indicated above, the audio data set can be subdivided into audio segments that have the same duration as a video frame of the video data set. In step 101, a correspondence between audio segments and video frames can be established, e.g., each audio segment corresponds to a single particular video frame. A correspondence between the audio data of the modified audio data set and the video frames of the original video data set can be established using the correspondence between the original audio data set and the original video data set, and the correspondence between the original audio data and modified audio data set. In step 104, the audio data of the modified audio data set can be grouped into audio segments having the same duration (i.e., amount of audio data) as found in the audio segments of the original audio data set. Thus, based upon the correspondence between the audio data of the modified audio data set and the video frames of the original video data set, the audio segments of the modified audio data set correspond to, depending upon the target display rate, one or more partial and/or complete video frames from the original video data set. In step 104, for each audio segment in the modified audio data set, the one or more partial or complete video frames from the original video data set that correspond to that audio segment can be modified to produce a single modified video frame that corresponds to that audio segment; the collection of these modified video frames is the modified video data set.

The modified video frames can be produced in any appropriate manner. For example, video frames can be eliminated from (display speedup), or added to (display slowdown), as appropriate, each of the groups of one or more partial or complete video frames that correspond to particular audio segments of the modified audio data set. Or, if the size of the original video data set is to be reduced, video frames that correspond to an audio segment of the modified audio data set can be blended to produce a single, blended video frame that is retained as part of the modified video data set. Similarly, if the size of the original video data set is to be increased, one or more video frames can be synthesized from existing video frames and added to the modified video data set. A hybrid of these approaches (addition or elimination of video frames, and blending of video frames) can also be used.

If video frames are to be eliminated from, or added to, the original video data set, it can be useful to modify the correspondence between video frames of the original video data set and segments of the modified audio data set so that only entire video frames are associated with each audio segment. For display speedup, this generally means that one or more video frames is associated with each audio segment of the modified audio data set, while for display slowdown, this generally means that zero or one video frames is associated with each audio segment of the modified audio data set. An implementation of this approach for display speedup is illustrated above in the example following the discussion of the method 100 of FIG. 1. Video frames can be eliminated or added based upon any desired criterion. For example, when video frames are being eliminated from the original video data set, the first or the last video frame in each group can be consistently selected for retention in the modified video data set. When video frames are being added to the original video data set, audio segments of the modified audio data set with which no video frame is associated can have the video frame associated with the immediately prior or immediately subsequent audio segment associated therewith. Whatever approach is used, the selection of a video frame from each group of video frames is preferably done consistently in order to enhance the quality of the audiovisual display produced from the modified audio and video data sets.

Blending or synthesizing of video frames can also be done in any appropriate manner. For example, when more than one video frame (in total) is associated with a segment from the modified audio data set, a blended video frame can be created by weighting the contribution of each of video frame according to the portion of the duration of that video frame that is associated with the particular audio segment. For example, if ¾ of the duration of a first video frame and ½ of the duration of a second video frame are associated with a particular segment, then the first and second video frames can be combined such that the content of the first video frame contributes 60%, i.e., 0.75/(0.75+0.5), of the content of the blended frame and the content of the second video frame contributes 40%, i.e., 0.5/(0.75+0.5), of the content of the blended frame. Or, if the correspondence between video frames of the original video data set and segments of the modified audio data set has been modified so that only entire video frames are associated with each audio segment, then the video frames that correspond to the audio segment can be blended to produce a blended video frame that then becomes part of the modified video data set. Video frames can be synthesized in a manner analogous to the above-described methods of blending.

The method 300 (FIG. 3) could be modified to further produce a modified video data set based upon the modified audio data set produced by that method as described above.

As the non-overlapped data of each audio segment of the original audio data set is stored (i.e., as the modified audio data set is produced) in step 312, that data can be marked as new to the modified audio data set. When the amount of data marked as new exceeds the length of an audio segment, an amount of data (the temporally earliest) equal to the length of an audio segment is marked as old (this audio data marked as old represents an audio segment in the modified audio data set). The remainder of the audio data remains marked as new and is subsequently associated with other audio data that is stored in step 312. A video frame from the original video data set is then selected for correspondence with the newly determined audio segment of the modified audio data set. In one embodiment, if the target display rate is greater than 1 (display speedup), the video frame associated with the second segment of the most recently overlapped pair of segments can be selected. In another embodiment, if the target display rate is less than 1 (display slowdown), the video frame associated with the first segment of the most recently overlapped pair of segments can be selected. Other ways of choosing the video frame to associate with a segment of the modified audio data set can be used. Generally, the method used is governed by the desire to achieve the best possible synchronization between the audio and video displays after variation of the apparent display rate.

It is to be understood that methods for producing a modified video data set other than those described above are contemplated by the invention; the above methods are merely illustrative of the possibilities.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:

1. For use with an audiovisual display system in which an original set of audio data and a related original set of video data can be used to generate an audiovisual display at a normal display rate, a method for enabling the apparent display rate of the audiovisual display to be varied from the normal display rate, the method comprising the steps of:

defining a correspondence between the original set of audio data and the original set of video data such that the original set of audio data is synchronized with the original set of video data;

determining a target display rate or rates for the audiovisual display;

creating a modified set of audio data, based upon the target display rate or rates and an evaluation of the content of the original set of audio data, that corresponds to the original set of audio data, wherein the step of creating a modified set of audio data further comprises the steps of:

identifying a first group of one or more audio samples of the original set of audio data that is adjacent to a second group of one or more audio samples from the original set of audio data that represents a corresponding pitch pulse or pulses that approximate to a predetermined degree the pitch pulse or pulses represented by the first group of audio samples; and blending the audio samples from the first and second groups of audio samples to produce a third group of one or more audio samples that replaces, or is added to, the first and second groups of audio samples; and creating a modified set of video data, based upon the modified set of audio data, the correspondence between the modified set of audio data and the original set of audio data, and the correspondence between the original set of audio data and the original set of video data, such that the modified set of video data is synchronized with the modified set of audio data.

2. A method as in claim 1, wherein the step of defining a correspondence between the original set of audio data and the original set of video data further comprises the steps of:

dividing the original set of video data into a plurality of subunits, each subunit of video data representing a duration of time that is substantially equal to the duration of time represented by each other subunit of video data;

dividing the original set of audio data into a plurality of segments, each segment representing a duration of time that is approximately coincident with and substantially equal to the duration of time of a corresponding subunit of video data; and identifying corresponding subunits of video data and segments of audio data.

3. A method as in claim 1, wherein at least one target display rate is faster than a normal display rate.

4. A method as in claim 1, wherein at least one target display rate is slower than a normal display rate.

5. A method as in claim 1, wherein the target display rate is a sequence of target display rates.

6. A method as in claim 1, wherein the step of determining a target display rate further comprises the step of ascertaining the value of a nominal target display rate specified by a user of the audiovisual display system.

7. A method as in claim 1, wherein the step of determining a target display rate further comprises the step of evaluating the audio and/or video data to automatically determine the value of the target display rate.

8. A method as in claim 7, wherein the step of evaluating further comprises the steps of:

analyzing the original set of audio data; and calculating the target display rate based upon the analysis of the original set of audio data.

9. A method as in claim 7, wherein the step of evaluating further comprises the steps of:

analyzing the original set of video data; and calculating the target display rate based upon the analysis of the video data.

10. A method as in claim 9, wherein:

the step of analyzing the original set of video data further comprises ascertaining the relative rate of change of the video data along various population-based dimensions; and the step of calculating further comprises the step of calculating the target display rate based upon the change in values of the data along the population-based dimensions.

11. A method as in claim 9, wherein:

the step of analyzing the original set of video data further comprises:

ascertaining portions of a video image represented by the original set of video data that change quickly; and ascertaining the frequency with which such quick changes occur; and the step of calculating further comprises the step of calculating the target display rate based upon the occurrence and frequency of quick changes in the video image.

12. A method as in claim 11, wherein the step of calculating further comprises establishing a target display rate for periods of time during which quick changes in the video image occur that is lower than the target display rate during other periods of time.

13. A method as in claim 9, wherein:

the step of analyzing the original set of video data further comprises tracking the motion of objects within a video image represented by the original set of video data; and the step of calculating further comprises the step of calculating the target display rate based upon the appearance of new objects in the video image.

14. A method as in claim 13, wherein the step of calculating further comprises establishing a target display rate for periods of time during which new objects appear in the video image that is lower than the target display rate during other periods of time.

15. A method as in claim 7, wherein the step of evaluating further comprises the steps of:

performing a first analysis of the original set of audio data; and performing a second analysis of the original set of audio data; and calculating the target display rate based upon the first and second analyses of the audio data.

16. A method as in claim 7, wherein the step of evaluating further comprises the steps of:

performing a first analysis of the original set of video data;

performing a second analysis of the original set of video data;

calculating the target display rate based upon the first and second analyses of the video data.

17. A method as in claim 7, wherein the step of evaluating further comprises the steps of:

analyzing the original set of audio data; and analyzing the original set of video data; and calculating the target display rate based upon the analyses of the audio and video data.

18. A method as in claim 1, wherein the step of creating a modified set of audio data further comprises the step of analyzing the content of the original set of audio data, the modified set of audio data being created based upon, in addition to the target display rate or rates, the content of the audio data.

19. A method as in claim 2, wherein the step of creating a modified set of video data further comprises the steps of:

establishing a correspondence between the modified audio data set and the original video data set, based upon the correspondence between the modified audio data set and the original audio data set and the correspondence between the original audio data set and the original video data set;

grouping the audio data of the modified audio data set into audio segments having the same amount of data as found in audio segments of the original audio data set;

identifying one or more partial or complete subunits of video data from the original video data set that correspond to each of the audio segments of the modified audio data set, based upon the correspondence between the modified audio data set and the original video data set; and modifying the subunits of video data in the original video data set as necessary to produce the modified video data set so that there is a one-to-one correspondence between audio segments of the modified audio data set and subunits of video data of the modified video data set.

20. A method as in claim 1, wherein the step of creating a modified set of video data further comprises the step of eliminating data from the original video data set.

21. A method as in claim 1, wherein the step of creating a modified set of video data further comprises the step of adding data to the original video data get.

22. A method as in claim 1, wherein the step of creating a modified set of video data further comprises the step of blending data from the original video data set so that the modified video data set has less data than the original video data set.

23. A method as in claim 1, wherein the step of creating a modified set of video data further comprises the step of synthesizing data, based on the data in the original video data set, so that the modified video data set has more data than the original video data set.

24. A method as in claim 1, further comprising the steps of:
generating an audio display from the modified set of audio data; and
generating a video display from the modified set of video data.

25. A method as in claim 2, wherein the subunits of video data are frames of video data.

26. A method as in claim 19, wherein the subunits of video data are frames of video data.

27. A method as in claim 1, wherein the step of blending further comprises the step of performing a linear cross fade of the audio samples of the first group of audio samples with the corresponding audio samples of the second group of audio samples.

28. A method as in claim 8, wherein:
the step of analyzing the original set of audio data further comprises the step of ascertaining the stress with which spoken portions of the audio data are uttered; and
the step of calculating further comprises the step of calculating the target display rate or rates based upon the relative stresses of the spoken portions of the audio data.

29. A method as in claim 28, wherein the step of ascertaining stress further comprises the step of computing energy terms for the spoken portions or the audio data.

30. A method as in claim 8, wherein:
the step of analyzing the original set of audio data further comprises the step of ascertaining the speaking rate at which spoken portions of the audio data are uttered; and
the step of calculating further comprises the step of calculating the target display rate or rates based upon the relative speeds of the spoken portions of the audio data.

31. A method as in claim 30, wherein the step of ascertaining speaking rates further comprises the step of ascertaining spectral changes in the spoken portions of the audio data.

32. A method as in claim 8, wherein:
the step of analyzing the original set of audio data further comprises the steps of:
ascertaining the stress with which spoken portions of the audio data are uttered;
ascertaining the speaking rate at which spoken portions of the audio data are uttered; and
combining corresponding stresses and speaking rates to produce audio tension values for the spoken portions; and
the step of calculating further comprises the step of calculating the target display rate or rates based upon the audio tension values of the spoken portions of the audio data.

33. A method as in claim 32, further comprising the step of ascertaining the value of a nominal target display rate specified by a user of the audiovisual display system, wherein the step of calculating further comprises the step of combining the audio tension values with the nominal target display rate to produce the target display rate.

34. A method as in claim 1, wherein the step of creating a modified set of audio data further comprises the steps of:
(i) dividing the original met of audio data into a plurality of segments, each segment representing a contiguous portion of the original set of audio data that occurs during a specified duration of time, each segment being adjacent to one or two other segments such that there are no gaps between segments and adjacent segments do not overlap;
(ii) selecting a first segment;
(iii) selecting a second segment, the second segment being temporally adjacent to the first segment;
(iv) overlapping an end portion of the first segment with an end portion of the second segment that is adjacent to the first segment, the end portion of the first segment including first segment overlap data and the end portion of the second segment including second segment overlap data;
(v) identifying as part of the modified set of audio data the audio data from the first segment that is not part of the first segment overlap data;
(vi) blending corresponding first segment overlap data and second segment overlap data; and
(vii) determining whether there are additional segments in the original set of audio data that have not been overlapped with an adjacent segment, wherein:
if there are additional segments, the following steps are further performed:
(viii) combining the blended overlap data with the audio data from the second segment that is not part of the second segment overlap data;
(ix) selecting the combined data as a new first segment; and
(x) selecting a new second segment that is temporally adjacent to the new first segment and that has not previously been selected as a segment; and
(xi) repeating steps (i) through (vii); and
if there are not additional segments, the following step is further performed: (xii) identifying as part of the modified set of audio data the blended data and the audio data from the second segment that is not part of the second segment overlay data.

35. A system for enabling the apparent display rate of an audiovisual display to be varied from a normal display rate at which an audiovisual display system can generate a display from an original set of audio data and a related original set of video data, comprising:
means for defining a correspondence between the original set of audio data and the original set of video data such that the original set of audio data is synchronized with the original set of video data;
means for determining a target display rate or rates for the audiovisual display;
means for creating a modified set of audio data, based upon the target display rate or rates and an evaluation of the content of the original set of audio data, that corresponds to the original set of audio data, wherein the means for creating a modified set of audio data further comprises:
  means for identifying a first group of one or more audio samples of the original set of audio data that is adjacent to a second group of one or more audio samples from the original set of audio data that represents a corresponding pitch pulse or pulses that approximate to a predetermined degree the pitch pulse or pulses represented by the first group of audio samples; and
  means for blending the audio samples from the first and second groups of audio samples to produce a third group of one or more audio samples that replaces, or is added to, the first and second groups of audio samples; and
  means for creating a modified set of video data, based upon the modified set of audio data, the correspondence between the modified set of audio data and the original set of audio data, and the correspondence between the original set of audio data and the original set of video data, such that the modified set of video data is synchronized with the modified set of audio data.

36. A system as in claim 35, further comprising:
means for generating an audio display from the modified set of audio data; and
means for generating a video display from the modified set of video data.

37. A system as in claim 35, further comprising:
means for enabling a user to specify a nominal target display rate; and
means for ascertaining the value of the nominal target display rate.

38. A system as in claim 35, wherein the means for defining a correspondence between the original set of audio data and the original set of video data further comprises:
  means for dividing the original set of video data into a plurality of subunits, each subunit of video data representing a duration of time that is substantially equal to the duration of time represented by each other subunit of video data;
  means for dividing the original set of audio data into a plurality of segments, each segment representing a duration of time that is approximately coincident with and substantially equal to the duration of time of a corresponding subunit of video data; and
  means for identifying corresponding subunits of video data and segments of audio data.

39. A system as in claim 35, wherein the means for determining a target display rate further comprises means for evaluating the audio and/or video data to automatically determine the value of the target display rate.

40. A system as in claim 39, wherein the means for evaluating further comprises:
  means for analyzing the original set of audio data; and
  means for calculating the target display rate based upon the analysis of the original set of audio data.

41. A system as in claim 39, wherein the means for evaluating further comprises:
  means for analyzing the original set of video data; and
  means for calculating the target display rate based upon the analysis of the video data.

42. A system as in claim 35, wherein the means for creating a modified set of audio data further comprises means for analyzing the content of the original set of audio data, the modified set of audio data being created based upon, in addition to the target display rate, the content of the audio data.

43. A system as in claim 38, wherein the means for creating a modified set of video data further comprises:
  means for establishing a correspondence between the modified audio data set and the original video data set, based upon the correspondence between the modified audio data set and the original audio data set and the correspondence between the original audio data set and the original video data set;
  means for grouping the audio data of the modified audio data set into audio segments having the same amount of data as found in audio segments of the original audio data set;
  means for identifying one or more partial or complete subunits of video data from the original video data set that correspond to each of the audio segments of the modified audio data set, based upon the correspondence between the modified audio data set and the original video data set; and
  means for modifying the video frames in the original video data set as necessary to produce the modified video data set so that there is a one-to-one correspondence between audio segments of the modified audio data set and video frames of the modified video data set.

44. A system as in claim 35, wherein at least one target display rate is faster than a normal display rate.

45. A system as in claim 35, wherein at least one target display rate is slower than a normal display rate.

46. A system as in claim 35, wherein the target display rate is a sequence of target display rates.

47. A system as in claim 40, wherein:
  the means for analyzing the original set of audio data further comprises means for ascertaining the stress with which spoken portions of the audio data are uttered; and
  the means for calculating further comprises means for calculating the target display rate or rates based upon the relative stresses of the spoken portions of the audio data.

48. A system as in claim 47, wherein the means for ascertaining stress further comprises means for computing energy terms for the spoken portions of the audio data.

49. A system as in claim 40, wherein:
  the means for analyzing the original set of audio data further comprises means for ascertaining the speaking rate at which spoken portions of the audio data are uttered; and
  the means for calculating further comprises means for calculating the target display rate or rates based upon the relative speeds of the spoken portions of the audio data.

50. A system as in claim 49, wherein the means for ascertaining speaking rates further comprises means for ascertaining spectral changes in the spoken portions of the audio data.

51. A system as in claim 40, wherein:
  the means for analyzing the original set of audio data further comprises:
    means for ascertaining the stress with which spoken portions of the audio data are uttered;
    means for ascertaining the speaking rate at which spoken portions of the audio data are uttered; and means for combining corresponding stresses and speaking rates to produce audio tension values for the spoken portions; and the means for calculating further comprises means for calculating the target display rate or rates based upon the audio tension values of the spoken portions of the audio data.

52. A system as in claim 51, further comprising means for ascertaining the value of a nominal target display rate specified by a user of the audiovisual display system, wherein the means for calculating further comprises means for combining the audio tension values with the nominal target display rate to produce the target display rate.

53. A system as in claim 35, wherein the means for creating a modified set of audio data further comprises:
   (i) means for dividing the original set of audio data into a plurality of segments, each segment representing a contiguous portion of the original set of audio data that occurs during a specified duration of time, each segment being adjacent to one or two other segments such that there are no gaps between segments and adjacent segments do not overlap;
   (ii) means for selecting a first segment;
   (iii) means for selecting a second segment, the second segment being temporally adjacent to the first segment;
   (iv) means for overlapping an end portion of the first segment with an end portion of the second segment that is adjacent to the first segment, the end portion of the first segment including first segment overlap data and the end portion of the second segment including second segment overlap data;
   (v) means for identifying as part of the modified set of audio data the audio data from the first segment that is not part of the first segment overlap data;
   (vi) means for blending corresponding first segment overlap data and second segment overlap data;
   (vii) means for determining whether there are additional segments in the original set of audio data that have not been overlapped with an adjacent segment;
   (viii) means for performing, if there are are additional segments, the following functions:
      combining the blended overlap data with the audio data from the second segment that is not part of the second segment overlap data;
      selecting the combined data as a new first segment;
      selecting a new second segment that is temporally adjacent to the new first segment and that has not previously been selected as a segment; and
      effecting operation of the (iv) means for overlapping, (v) means for identifying, (vi) means for blending corresponding first segment overlap data and second segment overlap data, (vii) means for determining, and (viii) means for performing or (ix) means for performing; and
   (ix) means for performing, if there are not additional segments, the function of identifying as part of the modified set of audio data the blended data and the audio data from the second segment that is not part of the second segment overlap data.

54. A system as in claim 41, wherein:
   the means for analyzing the original set of video data further comprises means for ascertaining the relative rate of change of the video data along various population-based dimensions; and
   the means for calculating further comprises means for calculating the target display rate based upon the change in values of the data along the population-based dimensions.

55. A system as in claim 41, wherein:
   the means for analyzing the original set of video data further comprises:
      means for ascertaining portions of a video image represented by the original set of video data that change quickly; and
      means for ascertaining the frequency with which such quick changes occur; and
   the means for calculating further comprises means for calculating the target display rate based upon the occurrence and frequency of quick changes in the video image.

56. A system as in claim 55, wherein the means for calculating further comprises means for establishing a target display rate for periods of time during which quick changes in the video image occur that is lower than the target display rate during other periods of time.

57. A system as in claim 41, wherein:
   the means for analyzing the original set of video data further comprises means for tracking the motion of objects within a video image represented by the original set of video data; and
   the means for calculating further comprises means for calculating the target display rate based upon the appearance of new objects in the video image.

58. A system as in claim 57, wherein the means for calculating further comprises means for establishing a target display rate for periods of time during which new objects appear in the video image that is lower than the target display rate during other periods of time.

59. A system as in claim 39, wherein the means for evaluating further comprises:
   means for performing a first analysis of the original set of audio data; and
   means for performing a second analysis of the original set of audio data; and
   means for calculating the target display rate based upon the first and second analyses of the audio data.

60. A system as in claim 39, wherein the means for evaluating further comprises:
   means for performing a first analysis of the original set of video data;
   means for performing a second analysis of the original set of video data;
   means for calculating the target display rate based upon the first and second analyses of the video data.

61. A system as in claim 39, wherein the means for evaluating further comprises;
   means for analyzing the original set of audio data; and
   means for analyzing the original set of video data; and
   means for calculating the target display rate based upon the analyses of the audio and video data.

62. A system as in claim 35, wherein the means for creating a modified set of video data further comprises means for eliminating data from the original video data set.

63. A system as in claim 35, wherein the means for creating a modified set of video data further comprises means for adding data to the original video data set.

64. A system as in claim 35, wherein the means for creating a modified set of video data further comprises means for blending data from the original video data set so that the modified video data set has less data than the original video data set.

65. A system as in claim 35, wherein the means for creating a modified set of video data further comprises means for synthesizing data, bared on the data in the original video data set, so that the modified video data set has more data than the original video data set.

66. A system as in claim 38, wherein the subunits of video data are frames of video data.

67. A system as in claim 43, wherein the subunits of video data are frames of video data.

68. A system as in claim 35, wherein the means for blending further comprises means for performing a linear cross fade of the audio samples of the first group of audio samples with the corresponding audio samples of the second group of audio samples.

69. A computer readable medium encoded with one or more computer programs for enabling the apparent display rates of an audiovisual display to be varied from a normal display rate at which an audiovisual display system can generate a display from an original set of audio data and a related original set of video data, comprising:

instructions for defining a correspondence between the original set of audio data and the original set of video data such that the original set of audio data is synchronized with the original set of video data;

instructions for determining a target display rate or rates for the audiovisual display;

instructions for creating a modified set of audio data, based upon the target display rate or rates and an evaluation of the content of the original set of audio data, that corresponds to the original set of audio data, wherein the instructions for creating a modified set of audio data further comprise:

instructions for identifying a first group of one or more audio samples of the original set of audio data that is adjacent to a second group of one or more audio samples from the original set of audio data that represents a corresponding pitch pulse or pulses that approximate to a predetermined degree the pitch pulse or pulses represented by the first group of audio samples; and instructions for blending the audio samples from the first and second groups of audio samples to produce a third group of one or more audio samples that replaces, or is added to, the first and second groups of audio samples; and instructions for creating a modified set of video data, based upon the modified set of audio data, the correspondence between the modified set of audio data and the original set of audio data, and the correspondence between the original set of audio data and the original set of video data, such that the modified set of video data is synchronized with the modified set or audio data.

70. A computer readable medium as in claim 69, wherein the instructions for defining a correspondence between the original set of audio data and the original set of video data further comprise:

instructions for dividing the original set of video data into a plurality of subunits, each subunit of video data representing a duration of time that is substantially equal to the duration of time represented by each other subunit of video data;

instructions for dividing the original set of audio data into a plurality of segments, each segment representing a duration of time that is approximately coincident with and substantially equal to the duration of time of a corresponding subunit of video data; and instructions for identifying corresponding subunits of video data and segments of audio data.

71. A computer readable medium as in claim 70, wherein the instructions for creating a modified set of video data further comprise:

instructions for establishing a correspondence between the modified audio data set and the original video data set, based upon the correspondence between the modified audio data set and the original audio data set and the correspondence between the original audio data set and the original video data set;

instructions for grouping the audio data of the modified audio data set into audio segments having the same amount of data as found in audio segments of the original audio data set;

instructions for identifying one or more partial or complete subunits of video data from the original video data set that correspond to each of the audio segments of the modified audio data set, based upon the correspondence between the modified audio data set and the original video data set; and instructions for modifying the video frames in the original video data set as necessary to produce the modified video data set so that there is a one-to-one correspondence between audio segments of the modified audio data set and video frames of the modified video data set.

72. A computer readable medium as in claim 69, wherein at least one target display rate is faster than a normal display rate.

73. A computer readable medium as in claim 69, wherein at least one target display rate is slower than a normal display rate.

74. A computer readable medium as in claim 69, wherein the target display rate is a sequence of target display rates.

75. A computer readable medium as in claim 69, wherein the instructions for determining a target display rate further comprise instructions for ascertaining the value of a nominal target display rate specified by a user of the audiovisual display system.

76. A computer readable medium as in claim 69, wherein the instructions for determining a target display rate further comprise instructions for evaluating the audio and/or video data to automatically determine the value of the target display rate.

77. A computer readable medium as in claim 76, wherein the instructions for evaluating further comprises:

instructions for analyzing the original set of audio data; and instructions for calculating the target display rate based upon the analysis of the original set of audio data.

78. A computer readable medium as in claim 77, wherein:

the instructions for analyzing the original set of audio data further comprise instructions for ascertaining the stress with which spoken portions of the audio data are uttered; and the instructions for calculating further comprise instructions for calculating the target display rate or rates based upon the relative stresses of the spoken portions of the audio data.

79. A computer readable medium as in claim 78, wherein the instructions for ascertaining stress further comprise instructions for computing energy terms for the spoken portions of the audio data.

80. A computer readable medium as in claim 77, wherein:

the instructions for analyzing the original set of audio data further comprise instructions for ascertaining the speaking rate at which spoken portions of the audio data are uttered; and the instructions for calculating further comprise instructions for calculating the target display rate or rates based upon the relative speeds of the spoken portions of the audio data.

81. A computer readable medium as in claim 80, wherein the instructions for ascertaining speaking rates further comprise instructions for ascertaining spectral changes in the spoken portions of the audio data.

82. A computer readable medium as in claim 77, wherein:

the instructions for analyzing the original set of audio data further comprises:

instructions for ascertaining the stress with which spoken portions of the audio data are uttered;

instructions for ascertaining the speaking rate at which spoken portions of the audio data are uttered; and instructions for combining corresponding stresses and speaking rates to produce audio tension values for the spoken portions; and the instructions for calculating further comprise instructions for calculating the target display rate or rates based upon the audio tension values of the spoken portions of the audio data.

83. A computer readable medium as in claim 82, further comprising instructions for ascertaining the value of a nominal target display rate specified by a user of the audiovisual display system, wherein the instructions for calculating further comprise instructions for combining the audio tension values with the nominal target display rate to produce the target display rate.

84. A computer readable medium as in claim 69, wherein the instructions for creating a modified set of audio data further comprise:

(i) instructions for dividing the original set of audio data into a plurality of segments, each segment representing a contiguous portion of the original set or audio data that occurs during a specified duration of time, each segment being adjacent to one or two other segments such that there are no gaps between segments and adjacent segments do not overlap;

(ii) instructions for selecting a first segment;

(iii) instructions for selecting a second segment, the second segment being temporally adjacent to the first segment;

(iv) instructions for overlapping an end portion of the first segment with an end portion of the second segment that is adjacent to the first segment, the end portion of the first segment including first segment overlap data and the end portion of the second segment including second segment overlap data;

(v) instructions for identifying as part of the modified set of audio data the audio data from the first segment that is not part of the first segment overlap data;

(vi) instructions for blending corresponding first segment overlap data and second segment overlap data; and (vii) instructions for determining whether there are additional segments in the original set of audio data that have not been overlapped with an adjacent segment, wherein:

if there are additional segments, the following instructions are further performed:

(viii) instructions for combining the blended overlap data with the audio data from the second segment that is not part of the second segment overlap data;

(ix) instructions for selecting the combined data as a new first segment; and (x) instructions for selecting a new second segment that is temporally adjacent to the new first segment and that has not previously been selected as a segment; and (xi) instructions for repeating instructions (i) through (vii); and if there are not additional segments, the following instructions are further performed: (xii) instructions for identifying as part of the modified set of audio data the blended data and the audio data from the second segment that is not part of the second segment overlap data.

85. A computer readable medium as in claim 76, wherein the instructions for evaluating further comprise:

instructions for analyzing the original set of video data; and instructions for calculating the target display rate based upon the analysis of the video data.

86. A computer readable medium as in claim 85, wherein:

the instructions for analyzing the original set or video data further comprise instructions for ascertaining the relative rate of change of the video data along various population-based dimensions; and the instructions for calculating further comprise instructions for calculating the target display rate based upon the chance in values of the data along the population-based dimensions.

87. A computer readable medium as in claim 85, wherein:

the instructions for analyzing the original set of video data further comprise:

instructions for ascertaining portions of a video image represented by the original set of video data that change quickly; and instructions for ascertaining the frequency with which such quick changes occur; and the instructions for calculating further comprise instructions for calculating the target display rate based upon the occurrence and frequency of quick changes in the video image.

88. A computer readable medium as in claim 87, wherein the instructions for calculating further comprise instructions for establishing a target display rate for periods of time during which quick changes in the video image occur that is lower than the target display rate during other periods of time.

89. A computer readable medium as in claim 85, wherein:

the instructions for analyzing the original set of video data further comprise instructions for tracking the motion of objects within a video image represented by the original set of video data; and the instructions for calculating further comprise instructions for calculating the target display rate based upon the appearance of new objects in the video image.

90. A computer readable medium as in claim 89, wherein the instructions for calculating further comprise instructions for establishing a target display rate for periods of time during which new objects appear in the video image that is lower than the target display rate during other periods of time.

91. A computer readable medium as in claim 76, wherein the instructions for evaluating further comprise:

instructions for performing a first analysis of the original set of audio data; and instructions for performing a second analysis of the original set of audio data; and instructions for calculating the target display rate based upon the first and second analyses of the audio data.

92. A computer readable medium as in claim 76, wherein the instructions for evaluating further comprise:
- instructions for performing a first analysis of the original set of video data;
- instructions for performing a second analysis of the original set of video data;
- instructions for calculating the target display rate based upon the first and second analyses of the video data.

93. A computer readable medium as in claim 76, wherein the instructions for evaluating further comprise:
- instructions for analyzing the original set of audio data; and
- instructions for analyzing the original set of video data; and
- instructions for calculating the target display rate based upon the analyses of the audio and video data.

94. A computer readable medium as in claim 69, wherein the instructions for creating a modified set of audio data further comprise instructions for analyzing the content of the original set of audio data, the modified set of audio data being created based upon, in addition to the target display rate or rates, the content of the audio data.

95. A computer readable medium as in claim 69, wherein the instructions for creating a modified set of video data further comprise instructions for eliminating data from the original video data set.

96. A computer readable medium as in claim 69, wherein the instructions for creating a modified set of video data further comprise instructions for adding data to the original video data set.

97. A computer readable medium as in claim 69, wherein the instructions for creating a modified set of video data further comprise instructions for blending data from the original video data set so that the modified video data set has less data than the original video data set.

98. A computer readable medium as in claim 69, wherein the instructions for creating a modified set of video data further comprise instructions for synthesizing data, based on the data in the original video data set, so that the modified video data set has more data than the original video data set.

99. A computer readable medium as in claim 69, further comprising:
- instructions for generating an audio display from the modified set of audio data; and
- instructions for generating a video display from the modified set of video data.

100. A computer readable medium as in claim 70, wherein the subunits of video data are frames of video data.

101. A computer readable medium as in claim 71, wherein the subunits of video data are frames of video data.

102. A computer readable medium as in claim 69, wherein the instructions for blending further comprise instructions for performing a linear cross fade of the audio samples of the first group of audio samples with the corresponding audio samples of the second group of audio samples.

* * * * *